United States Patent
Morimoto et al.

(10) Patent No.: US 6,492,741 B1
(45) Date of Patent: Dec. 10, 2002

(54) MOTOR CONTROL APPARATUS COMBINED TO ENGINE

(75) Inventors: Kazuhiko Morimoto, Hamamatsu (JP); Yoshiaki Omata, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 32 days.

(21) Appl. No.: 09/672,634

(22) Filed: Sep. 28, 2000

(30) Foreign Application Priority Data

Sep. 30, 1999 (JP) .......................................... 11-279421

(51) Int. Cl.$^7$ ................................................ H02P 1/00
(52) U.S. Cl. ...................... 290/40 C; 318/255; 180/65.1
(58) Field of Search ............................. 290/40 A, 40 B, 290/40 C; 322/16; 180/65.1; 318/255

(56) References Cited

U.S. PATENT DOCUMENTS

| | | | |
|---|---|---|---|
| 5,621,304 A | 4/1997 | Kiuchi et al. ................. 322/18 |
| 5,839,533 A | 11/1998 | Mikami et al. ............. 180/165 |
| 5,841,201 A | 11/1998 | Tabata et al. ............. 290/40 C |
| 5,895,333 A | 4/1999 | Morisawa et al. ............. 475/5 |
| 5,935,040 A | 8/1999 | Tabata et al. .................. 477/3 |
| 6,018,198 A | 1/2000 | Tsuzuki et al. ............... 290/17 |
| 6,018,199 A | 1/2000 | Shiroyama et al. ........ 290/37 A |
| 6,114,775 A | 9/2000 | Chung et al. ............. 307/10.1 |
| 6,137,250 A * | 10/2000 | Hirano et al. .............. 180/65.2 |
| 6,234,932 B1 | 5/2001 | Kuroda et al. .................. 477/3 |
| 6,335,573 B1 * | 1/2002 | Eguchi et al. ............ 290/40 C |
| 6,335,574 B1 * | 1/2002 | Ochiai et al. .................. 290/17 |
| 6,345,216 B1 * | 2/2002 | Morimoto et al. .......... 180/337 |
| 6,348,771 B1 * | 2/2002 | Morimoto et al. ......... 180/65.1 |
| 2001/0011050 A1 * | 8/2001 | Yamaguchi et al. ............ 477/3 |
| 2001/0023790 A1 * | 9/2001 | Hasegawa ................... 180/339 |
| 2001/0049571 A1 * | 12/2001 | Shimizu et al. ............... 701/22 |
| 2002/0020571 A1 * | 2/2002 | Morimoto et al. ......... 180/65.3 |

FOREIGN PATENT DOCUMENTS

| | | |
|---|---|---|
| JP | 6-257484 | 9/1994 |
| JP | 8-93517 | 4/1996 |
| JP | 10-47104 | 2/1998 |
| JP | 10-136508 | 5/1998 |

* cited by examiner

Primary Examiner—Nicholas Ponomarenko
(74) Attorney, Agent, or Firm—Flynn, Thiel, Boutell & Tanis, P.C.

(57) ABSTRACT

A motor control apparatus is combined with an internal combustion engine and an electric motor to form a vehicle-propelling system. The motor is connected to a crank shaft of the engine and has both driving and power-generating functions. The motor control apparatus includes an automatic start-up/stop control device having automatic start-up control and automatic stop control sections. When the vehicle is started with a key, the automatic start-up control section uses the starter motor and always gains assistance from the electric motor in starting the vehicle. Only the automatic start-up control section controls start up of the electric motor, which prevents a noise occurring when a ring gear is engaged with a starter motor gear. This operation improves the quietness of the engine. This arrangement enhances discharge of exhaust gas.

9 Claims, 18 Drawing Sheets

FIG.10

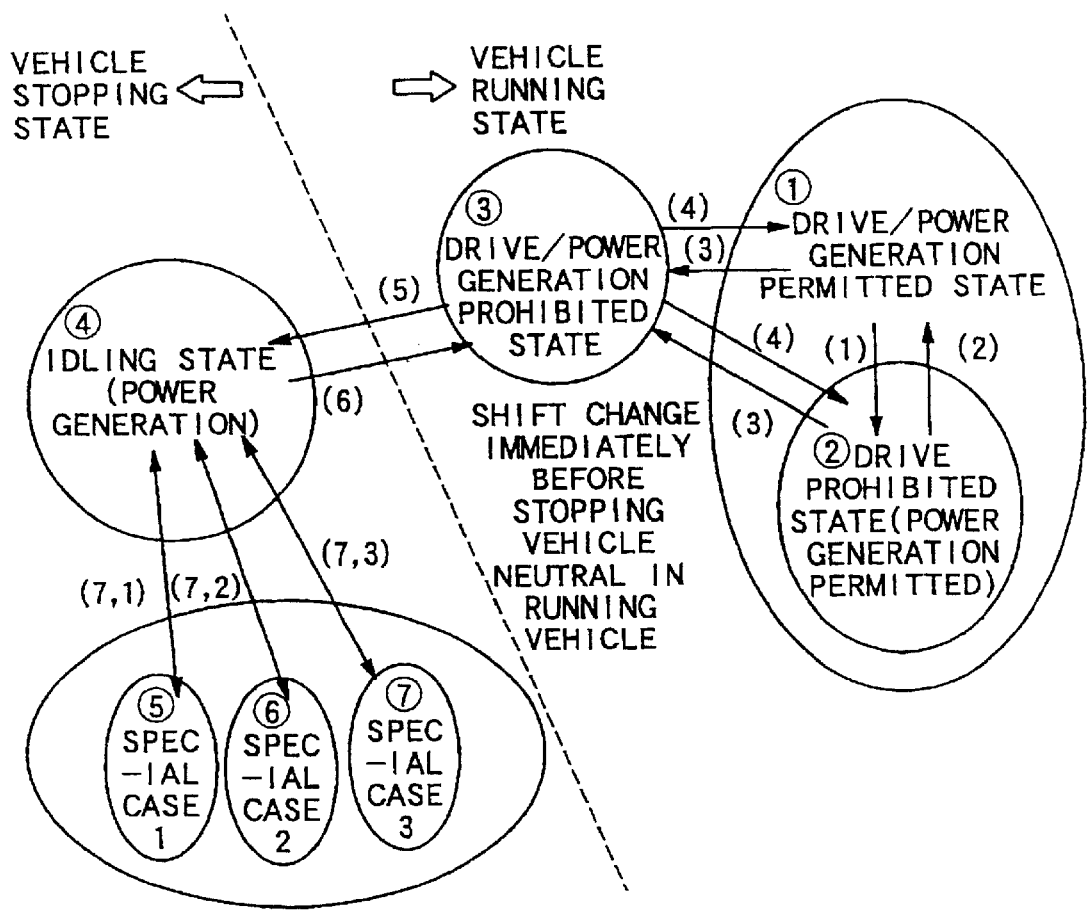

① DRIVE/POWER GENERATION PERMITTED:DRIVE/POWER GENERATION CONTROL

② DRIVE PROHIBITED(POWER GENERATION PERMITTED): POWER GENERATION CONTROL(VEHICLE RUNNING)

③ DRIVE/POWER GENERATION PROHIBITED:MOTOR CONTROL PROHIBITED

④ IDLING:POWER GENERATION CONTROL

⑤ SPECIAL CASE 1(VEHICLE STARTING STATE): DRIVING CONTROL

⑥ SPECIAL CASE 2(ENGINE STARTING STATE):DRIVING CONTROL (VEHICLE STATIONARY)

⑦ SPECIAL CASE 3(IDLING STABILIZING CONTROL STATE): DRIVING CONTROL

| MAP | DRIVING TORQUE |
|---|---|
| MOTOR SPEED | PREDETERMINED VOLTAGE |

| MAP | DRIVING TORQUE |
|---|---|
| MOTOR SPEED | MAXIMUM VOLTAGE VARIATION VALUE |

FIG.15
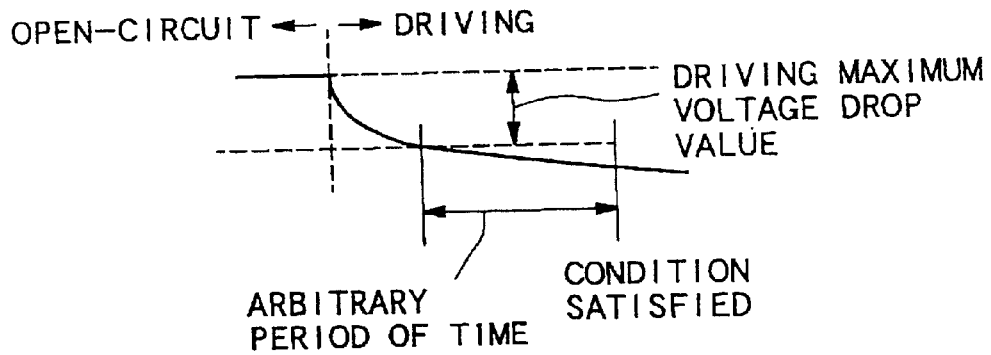
FIG.16
| MAP | DRIVING TORQUE |
|---|---|
| MOTOR SPEED | DRIVING MAXIMUM VOLTAGE DROP VALUE |
FIG.17
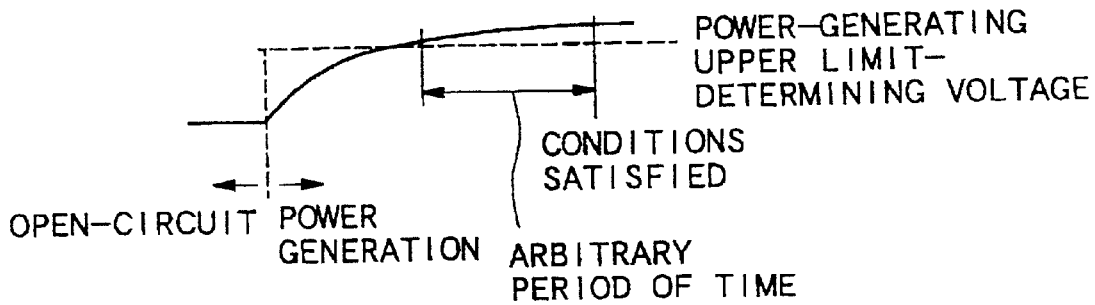
FIG.18
| MAP | DRIVING TORQUE |
|---|---|
| MOTOR SPEED | UPPER LIMIT-DETERMINING VOLTAGE |

MOTOR CONTROL APPARATUS COMBINED TO ENGINE

CROSS REFERENCE TO RELATED APPLICATIONS

This application is related to co-pending commonly owned applications Ser. No. 09/672,631 and Ser. No. 09/672,633, both titled "MOTOR CONTROL APPARATUS COMBINED TO ENGINE" and both filed Sep. 28, 2000. The disclosures of the related applications are, in their entirety, incorporated herein by reference.

FIELD OF THE INVENTION

This invention relates to a motor control apparatus combined with an engine, particularly to a motor control apparatus combined with an engine having an automatic start-up/stop control means for start-up, which is disposed in a vehicle having the engine and an electric motor disposed therein as a vehicle-propelling system. The motor is combined with a crank shaft of the engine, and has both driving and power-generating functions.

BACKGROUND OF THE INVENTION

Some motor vehicles are of a type commonly called a hybrid vehicle having an internal combustion engine and an electric motor (referred to as "motor" throughout the specification) disposed therein as the power sources of a propulsion system. The motor disposed in the hybrid vehicle is combined with the engine, and the hybrid vehicle further includes an engine control means for controlling a running state of the engine and a motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and power performance).

One such example of a control apparatus for a motor combined with an engine is disclosed in published Japanese Application Laid-Open No. 8-93517. The hybrid electric powered vehicle includes a power generating apparatus driven by an engine and a battery for powering the vehicle. The vehicle includes a motor that can receive electric power supplied from the battery, or the power generating apparatus can supply electric power to the battery. An electronic control apparatus for controlling the motor is powered by a sub-battery. The electronic control apparatus includes a means for determining that the engine is started, a means for prohibiting driving of the starter by electric power from the sub-battery during control of the motor after the engine is determined to have started and a means for determining whether a terminal voltage of the sub-battery is less than a predetermined voltage. As a result, the control means prevents a false movement of an electronically controlled apparatus due to a drop in voltage of the sub-battery during a restart operation for the engine.

Published Japanese Patent Application Laid-Open No. 10-136508 discloses a hybrid vehicle that has an engine operated by combustion energy of fuel and an electric motor operating by electric power from a power source in the vehicle. The vehicle has a starter for start up, and usually is started by cranking an engine with the electric motor. But, the hybrid vehicle has an engine start-up control means to start cranking the engine with the starter when a start-up by the electric motor is determined to be impossible. Then engine start-up control means has an additional function to assist in cranking the engine when the hybrid vehicle starts cranking an engine with the starter. In this way, the hybrid vehicle suitably starts up the engine by using the small and cheap starter.

In published Japanese Patent Application Laid-Open No. 6-257484, the engine automatic start-up/stop apparatus controls start up of an engine when a predetermined start-up condition is satisfied after the engine disposed in a vehicle is stopped, and also stops the engine when a predetermined stopping condition is satisfied during running of the engine. In the engine automatic start-up/stop apparatus, when a predetermined time condition passes while a stop mode is continued after the engine is started up by an operation of an engine-key, and a following stopping condition when the vehicle moves, satisfying a condition, then the engine is automatically stopped. The automatic start-up/stop apparatus makes automatic shutoff of an engine possible when the temperature is low, and improves mileage when a driving time is comparatively short.

Published Japanese Patent Laid-Open No. 10-47104 discloses an engine automatic start-up/stop apparatus which is controlled so as to automatically stop when a predetermined automatic stop condition is satisfied during running of an engine disposed in a vehicle, and is controlled to automatically start up when a predetermined automatic start-up condition occurs after being automatically stopped. The engine automatic start-up/stop apparatus determines whether the vehicle is started up by the engine-key when the engine is started up, and whether the vehicle is started up after automatically being stopped, and can change the initial value of a revision quantity of an idle air flow quantity at a key start-up mode and the initial value at an automatic start mode.

The engine automatic start-up/stop apparatus prevents an unnecessary rise of an idle speed in automatically starting-up the vehicle after automatically being stopped, and improves the mileage.

A control means of a motor combined with an engine is used for a so-called idle-stop vehicle. The idle-stop vehicle is restarted by a starter motor after the engine is stopped.

If using the starter motor to restart, when the starter motor is engaged with a ring gear, an inconvenience occurs from a noisy sound. There is also inconvenience in that the durability of a starter motor is decreased.

When the engine is restarted, a starting-up compensation acts, and it can become unnecessarily rich in fuel to maintain a rise of engine speed. As a result, there is inconvenience in that more fuel is used than needed. Further, an exhaust gas containing harmful ingredients in unnecessary abundance is exhausted. When a restart of an engine occurs for a fixed time, additional fuel is desirable for a certain mileage distance and a proper output dispersion of exhaust gas from the engine continues.

In the apparatus disclosed in published Japanese Patent Application Laid-Open No. 10-136508, when cranking by a motor is impossible, then the cranking may be done by a starter. When the cranking is done by the starter, then the motor assists in cranking the engine according to need. In operation of the above-mentioned published Japanese Patent Application Laid-Open No. 10-136508, inconvenience occurs from noisy sound when a starter gear is engaged.

SUMMARY OF THE INVENTION

In order to obviate the above problems, the present invention provides a motor control apparatus combined with an engine and an electric motor in a vehicle-propelling system. The motor is connected to a crank shaft of the engine and has both driving and power-generating functions. An automatic start-up/stop control means includes automatic start-up control and automatic stop control sections. The start-up control section starts the vehicle using the starter motor while always receiving assistance from the motor when the vehicle is started with a key. The automatic start-up control section automatically starts up the motor, which cancels noisy sounds occurring when a ring gear engages a starter motor gear. This improves quietness, which characteristic is advantageous in practical use. Further, improved characteristics for discharge of exhaust gas result.

According to the present invention as previously described, at automatic start-up, the control means controls a vehicle start up automatically using only the motor and cancels noisy sounds occurring when a ring gear engages with a starter motor gear. As a result, the quietness is improved, better dispersion of the exhaust gas is expected, and a simplification of the system results.

BRIEF DESCRIPTION OF THE DRAWINGS

FIG. 10 is a schematic diagram illustrating switching over in a control mode;

FIG. 15 is a time-chart showing when a maximum voltage variation value, immediately after driving is lower than a main battery open-circuit voltage minus a driving voltage;

FIG. 16 is a map of a relation between driving torque and motor speed;

FIG. 17 is a time-chart showing when a power-generating main battery voltage continues to be greater than a power-generating upper limit-determining voltage (a set value for each power-generating torque) for an arbitrary period of time;

FIG. 18 is a map of a relation between driving torque and motor speed;

DETAILED DESCRIPTION

Figure 1:
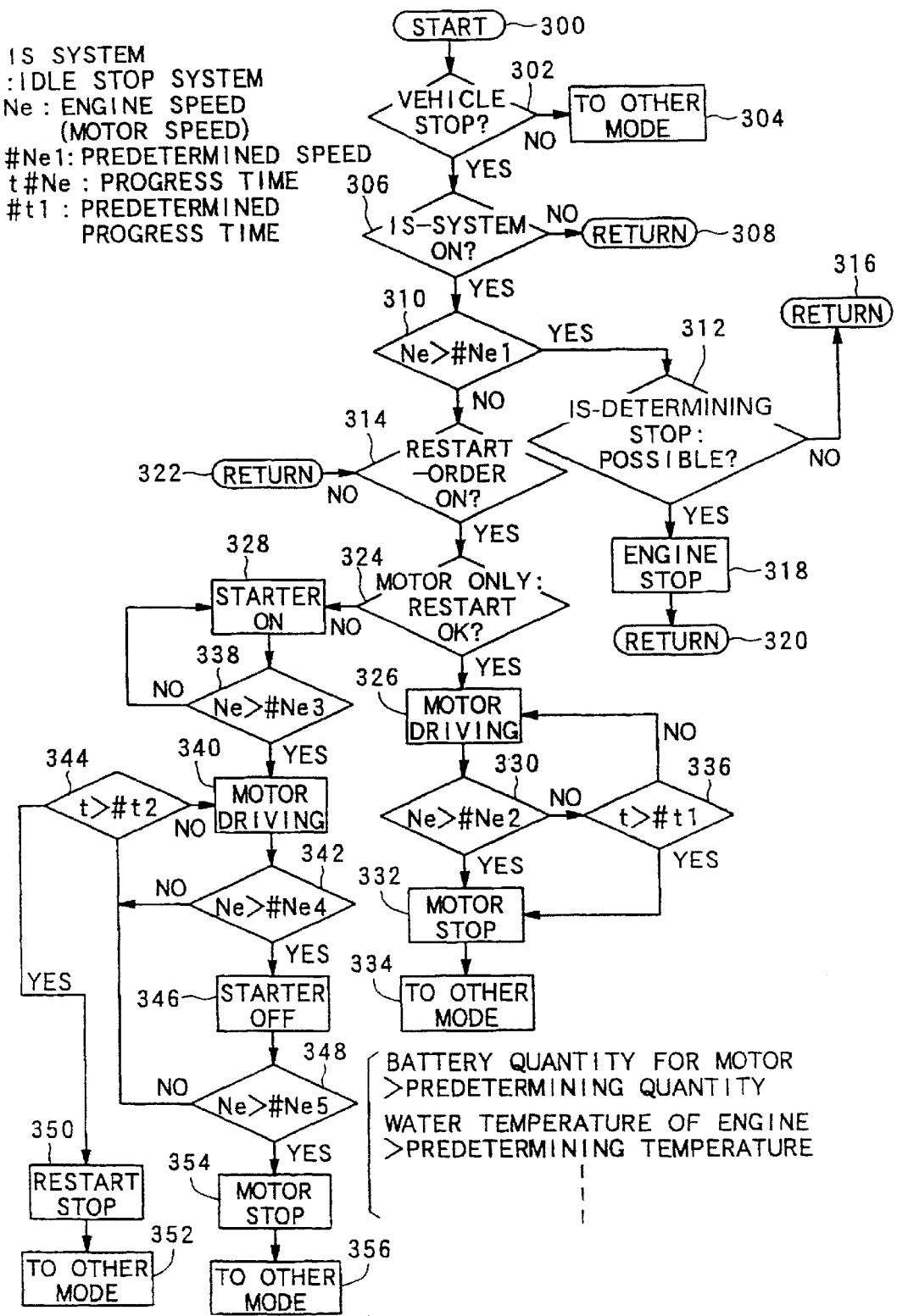
FIG. 1 is an automatic start-up/stop control flowchart in a motor control apparatus combined with an engine according to a first embodiment of the present invention.

Embodiment of the present invention will now be described in specific detail with reference to the drawings. FIGS. 1–21 illustrate a first embodiment of this invention. In FIG. 5, reference numeral 2 denotes a vehicle-propelling system of a vehicle; reference numeral 4 denotes an engine; 6 denotes an electric motor (referred to as "motor" hereafter) combined with the engine; 8 denotes a clutch; and, 10 denotes a manually operated transmission. The vehicle has the engine 4 and the motor 6 disposed therein as the vehicle-propulsion system 2. The motor 6 has both a driving function and a power-generating function.

The motor 6 is connected directly to a crank shaft (not shown), and connects with the transmission 10 by manual operation through a clutch 8. The engine 4 includes an alternator 12, an air-conditioner compressor 14 for an air-conditioner (A/C), and a starter motor 16.

Figure 2:
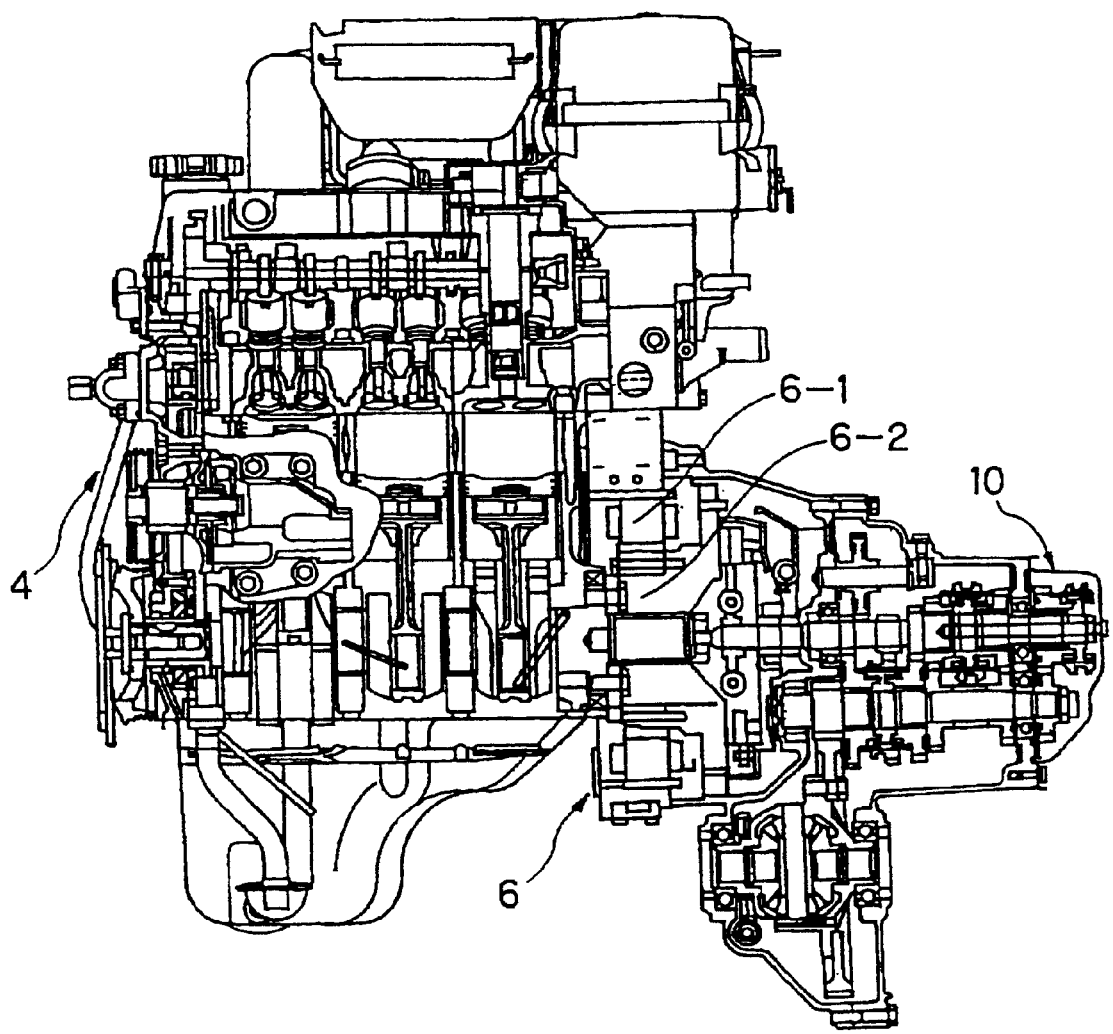
FIG. 2 is a schematic cross-sectional view of an engine.

The motor 6, as shown in FIG. 2, is shown positioned between the engine 4 and the manually operated transmission 10. In addition, the motor 6 includes a stator coil 6-1 and a rotor 6-2 such as a flywheel.

The vehicle-propulsion system 2 includes, as a control means 18, engine control means 20 and motor control means 22. The engine control means 20 controls a running state of the engine 4, while the motor control means 22 controls both driving and power-generating states of the motor 6.

The engine 4 is connected to the engine control means 20 through an engine-controlling signal line 24. "Line" is used herein to described any electrical signal conduit. The engine control means 20 is linked to a sub-battery 28 through an engine control means-dedicated power line 26. The sub-battery 28 is coupled to the alternator 12 through a sub-battery-charging power line 30. The sub-battery 28 is a conventional 12 volt vehicle battery.

The motor 6 is connected to the motor control means 22 through a motor-controlling signal line 32. The motor control means 22 is linked to the sub-battery 28 through a motor control means-dedicated sub-power line 34 and the power line 26. The motor control means 22 is also coupled to a main battery 38 through a motor control means-dedicated main power line 36. The main battery 38 supplies driving electric power to the motor 6 and is charged by generated electric power from the motor 6.

Figure 6:
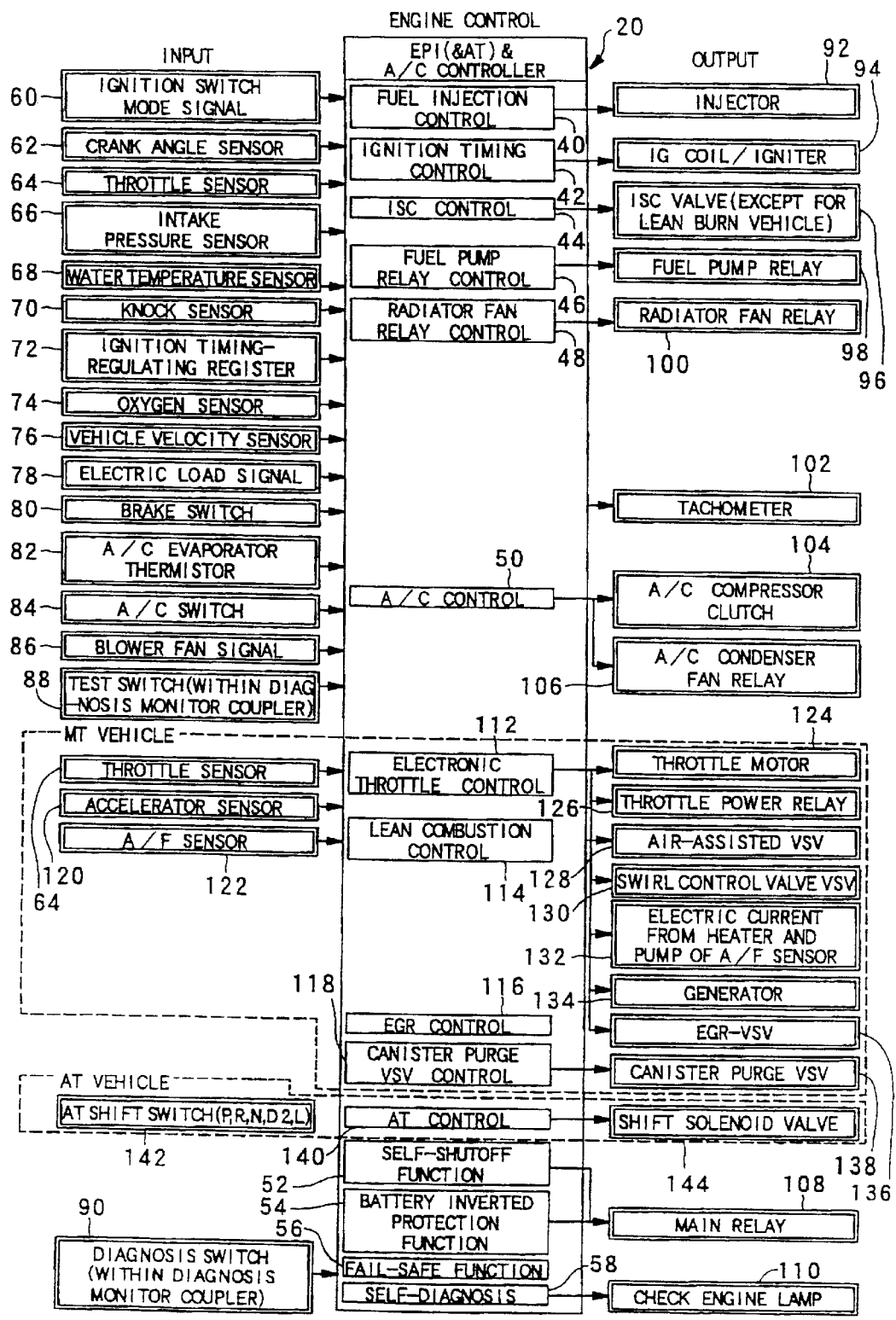
FIG. 6 is a schematic block diagram showing a structure of an engine controller.

As illustrated in FIG. 6, the engine control means 20 includes: a fuel injection control section 40; an ignition timing control section 42; an idle speed control (ISC) section 44; a fuel pump relay control section 46; a radiator fan relay control section 48; an air-conditioner (A/C) control section 50; a self-shutoff function section 52; a sub-battery inverted polarity protection function section 54; a fail-safe function section 56; and a self-diagnosis section 58.

The engine control means 20 is connected at the input side to: an ignition switch 60; a crank angle sensor 62; a throttle sensor 64; an intake pressure sensor 66; a water temperature sensor 68; an engine knock sensor 70; an ignition "timing-regulating" register 72; an oxygen sensor 74; a vehicle velocity sensor 76; an electric load sensor 78; a brake switch 80; an A/C evaporator thermistor 82; an A/C switch 84; a blower fan 86; a test switch 88; and a diagnosis switch 90.

The engine control means 20 is linked at the output side to: an injector 92; an ignition coil/igniter 94; an ISC valve 96; a fuel pump relay 98; a radiator fan relay 100; a tachometer 102; an A/C compressor clutch 104; an A/C condenser fan relay 106; a main relay 108; and, a check engine lamp 110.

When the transmission 10 is of a manually-operated type, then the engine control means 20 further includes the following as enclosed by a dashed line; an electronic throttle control section 112; a lean combustion control section 114; an EGR control section 116; and a canister purge valve control section 118. In this case, the engine control means 20 is connected at the input side to an accelerator sensor 120 and an air/fuel (A/F) sensor 122 as well as the throttle sensor 64. In addition, the engine control means 20 is linked at the output side to: a throttle power relay 126; an air-assisted valve 128; a swirl control valve 130; a heater and pump 132 of the A/F sensor 122; a generator 134; an EGR valve 136; and a canister purge valve 138. Valves 128, 136 and 138 are vacuum switch valves (VSV).

Alternatively, when the transmission 10 is of an automatically operated type (AT), then the engine control means 20 further includes an AT control section 140. In this case, the engine control means 20 is connected at the input side to an AT shift switch 142, while being linked at the output side to a shift solenoid valve 144.

The engine control means 20 drives the injector 92 and the ignition coil/igniter 94 in response to signals from the crank angle sensor 62 and the throttle sensor 64, thereby controlling a running state of the engine 4 such as fuel injection quantity and ignition timing.

Figure 7:
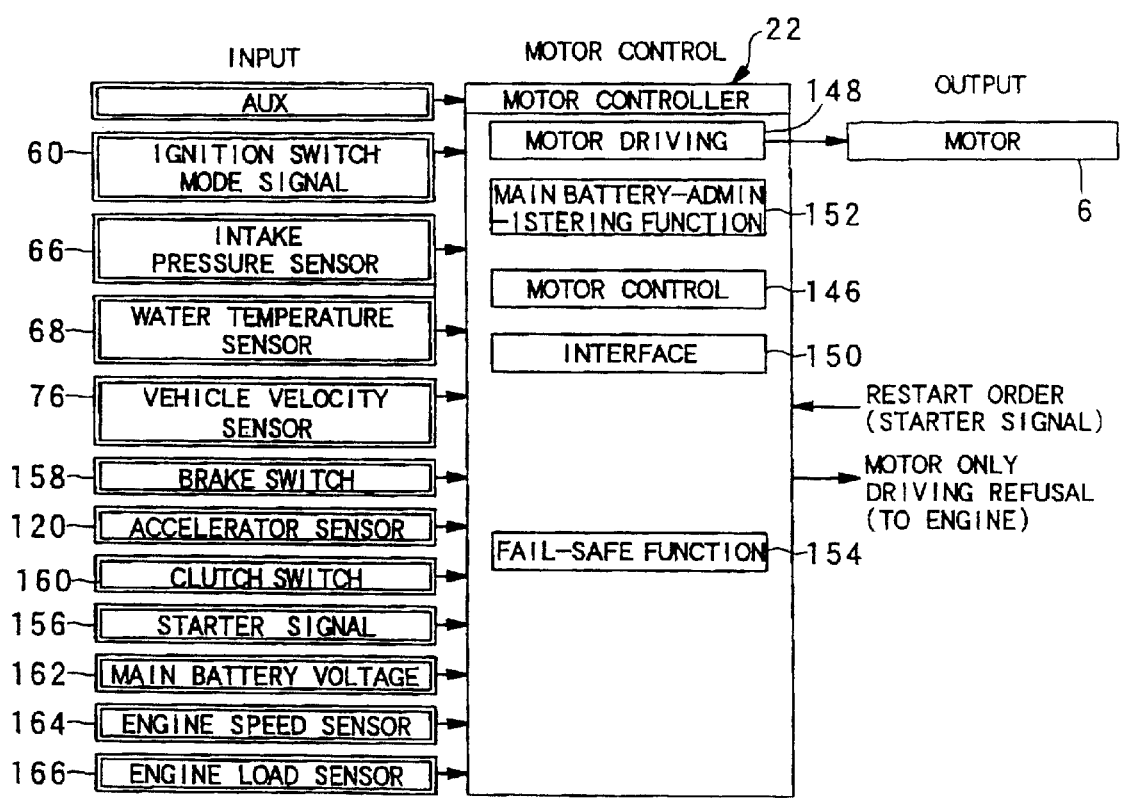
FIG. 7 is a schematic block diagram showing a structure of a motor controller.

Referring to FIG. 7, the motor control means 22 is shown including a motor control section 146, a motor-driving section 148, an input/output-processing section (interface) 150, a main battery mode-administering section 152, and a fail-safe section 154.

The motor control means 22 is connected at the input side to a starter switch 156, a brake switch 158, clutch switches 160, a main battery voltage detector 162, an engine rotational speed-detecting means or an engine speed sensor 164, and an engine load-detecting means or an engine load sensor 166, as well as the ignition switch 60, the intake pressure sensor 66, the water (coolant) temperature sensor 68, the vehicle velocity sensor 76, the accelerator sensor 120. The engine speed sensor 164 and the crank angle sensor 62 are the same element, but in explanation of each constitution, they are explained with different names. They are usually a unified element.

The two clutch switches 160 are disposed respectively in upper and lower positions, and the signal of at least one of the clutch switches, which is the same as the signal inputted into the engine control means 20, is input into the motor control means 22. The clutch switch is used as a means for assisting in starting a vehicle, and for prohibiting both the drive and power-generation of the motor, by the motor control means 22. But, a signal from the clutch switch 160 is not used to determine a restart. The motor control means 22 is linked at the output side to the motor 6.

The control means 18 of the vehicle-propelling system 2 includes both the engine control means 20 and the motor control means 22. The engine control means 20 controls an operating state of the engine 4, while the motor control means 22 controls both driving and power-generating states of the motor 6. The control means 18 includes an automatic start-up/stop control means 172 for controlling both an automatic starting-up control and an automatic stop control for the engine 4. The motor control means 22 exchanges no data with the engine control means 20. More specifically, the motor control means 22 is independent of control over the engine 4 executed by the engine control means 20, and thus independently controls and determines the driving and power-generating states of the motor 6.

Figure 8:
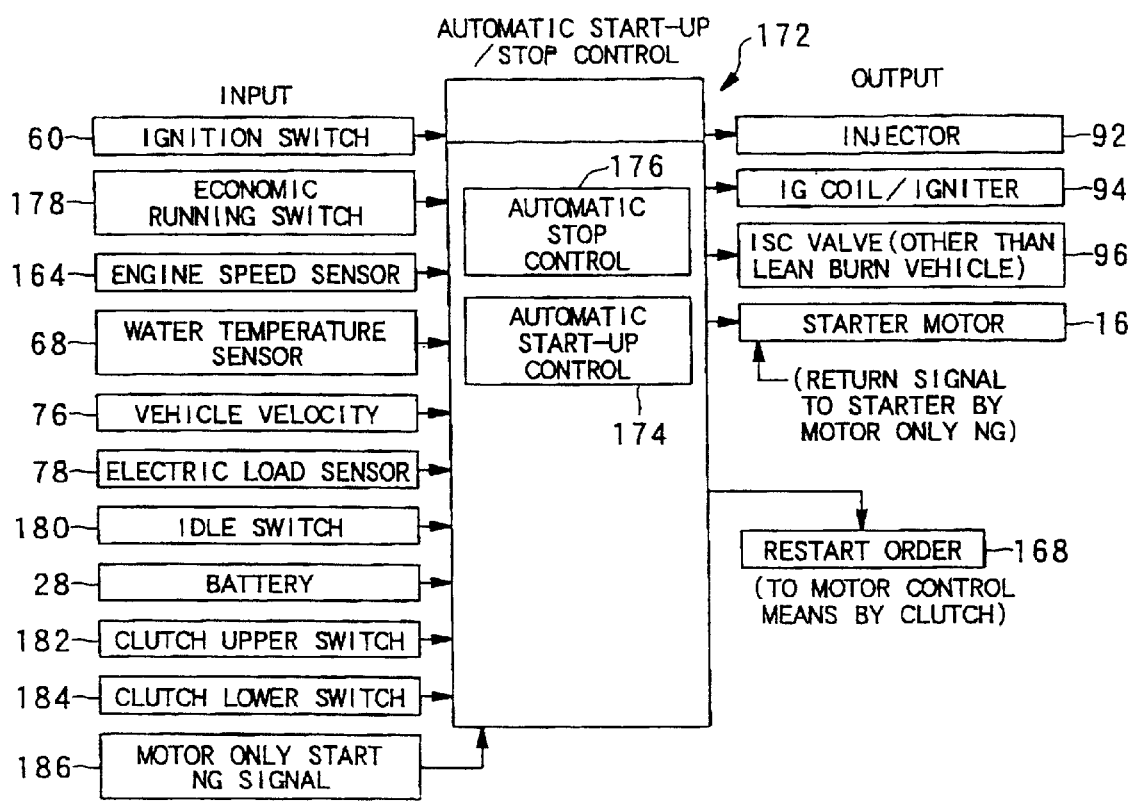
FIG. 8 is a schematic block diagram showing a structure of an automatic start-up/stop control means.

The automatic start-up/stop control means 172, as shown in FIG. 8, which functions as an economic running controller, includes both an automatic start-up control section 174 and an automatic stop control section. The automatic start-up control means 172 is connected at the input side to an ignition switch 60, an economic running switch 178, an engine speed sensor 164, a water temperature sensor 68, a vehicle velocity sensor 76, an electric load signal 78, an idle switch 180, a battery 28, a clutch upper switch 182, a clutch lower switch 184, and a motor starting-up NG signal 186, and at the output side to an injector 92, an IG coil/igniter 94, an ISC valve (except for lean burn vehicles) 96 and a starter motor 16.

The automatic start-up/stop control means 172 sends a restart order (starter signal) to the motor control means 22 by the clutch 8. Then, a restart order is output from the engine control means 20, in much the same way as an engine control system of an idle stop vehicle now in use.

The motor control means 22, as shown in FIG. 10, is set into a stopping control mode or state or a traveling control mode or state, as control modes that are based on a running state of the vehicle. In addition, the motor control means 22 is at first put into a drive/power generation-prohibiting control mode when switching over between the stopping control mode and the traveling control mode. In this way, the motor control means 22 executes control over the motor 6. The drive/power generating-prohibiting control mode prohibits both driving and power generation of the motor 6.

The motor control means 22 receives a main battery voltage signal from the main battery voltage detector 162. The detector 162 detects a main battery voltage of the main battery 38. The battery 38 supplies driving electric power to the motor 6 or is charged by generated electric power from the motor 6. Further, the motor control means 22 has control over the main battery mode-administering section 152 in such a manner that the administering section 152 governs a main battery mode according to the main battery voltage.

The stopping control mode of the motor control means 22, as shown in FIG. 10, may be set into an idling power generation control mode or state, a starting drive control mode or state, a start-up drive control mode or state, and an idle-stabilized drive control mode or state. When in the idling power generation control mode, the motor control means 22 assumes control over the motor 6 so as to permit the motor 6 to generate power and then charge the main battery 38 therewith. When in the starting vehicle motion drive control mode, the motor control means 22 assumes control over the motor 6 so as to drive the motor 6 and then assists in starting the vehicle. In the start-up drive control mode, the motor control means 22 provides control over the motor 6 so as to drive the motor 6 and then assists in starting up the engine 4. In the idle-stabilized drive control mode, the motor control means 22 provides control over the motor 6 so as to drive the motor and stabilize idling of the engine 4.

The traveling control or vehicle running mode of the motor control means 22, as shown in FIG. 10, may be set into a drive/power generation-permitting control mode or state, a drive-prohibiting control mode or state, or a drive/power generation-prohibiting control mode or state. In the drive/power generation-permitting control mode, the motor control means 22 provides control over the motor 6 so as to permit either of the driving or power generation of the motor 6. In the drive-prohibiting control mode, the motor control means 22 executes control over the motor 6 so as to prohibit the driving of the motor 6, but to permit the motor 6 to generate power. In the drive/power generation-prohibiting control mode, the motor control means 22 executes control over the motor 6 so as to prohibit both the driving and power generation of the motor 6.

The motor control means 22 switches over between the above-described drive/power generation-permitting control mode and drive-prohibiting control mode according to the main battery voltage of the main battery 38 governed by the main battery mode-administering section 152 of the motor control means 22.

Figure 9:
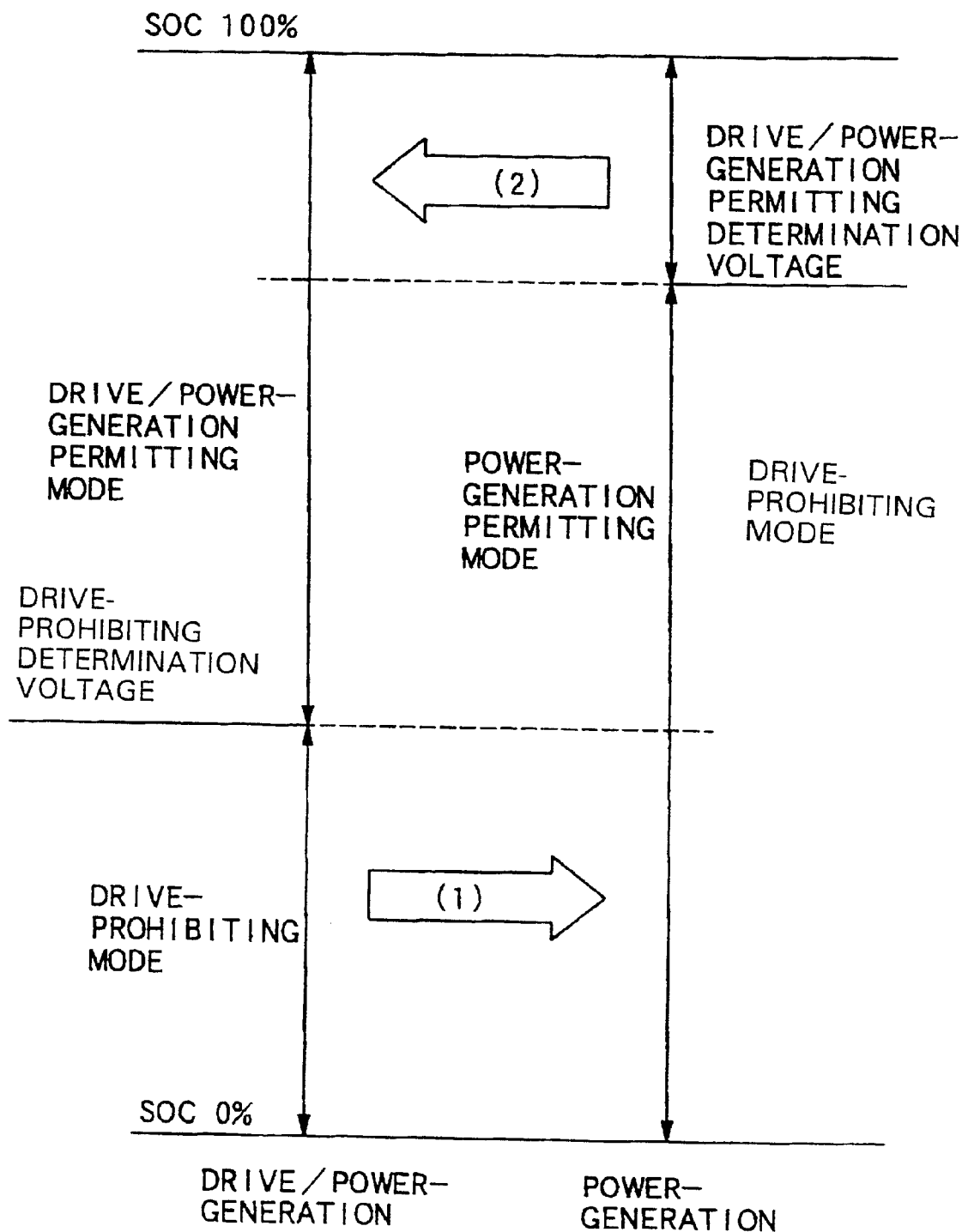
FIG. 9 is a schematic diagram showing a battery control mode.

More specifically, when the main battery voltage is charged at 100% state of charge (SOC), then the motor control means 22, as shown in FIG. 9, is in the drive/power generation-permitting control mode, and assumes control over the motor 6 so as to permit either the driving or power generation of the motor 6. However, when the main battery voltage falls below a lower limit or a drive-prohibiting determination voltage, then the motor control means 22 is put into the drive-prohibiting control mode, and the motor control means allows only power generation driving until the main battery voltage recovers beyond the arbitrary voltage.

In the drive-prohibiting control mode, as shown in FIG. 9, the motor control means 22 gains control over the motor 6 so as to prohibit the driving of the motor 6, but permits the motor 6 to generate power until the main battery voltage reaches a drive/power generation-permitting determination voltage. When the main battery voltage exceeds the drive/power generation-permitting determination voltage, after the main battery voltage recovers by the power generation driving, then the motor control means 22 is returned to the drive/power generation-permitting control mode. In this mode, the motor control means 22 effects control over the motor 6 so as to permit both the driving and power generation of the motor 6.

Figure 11:
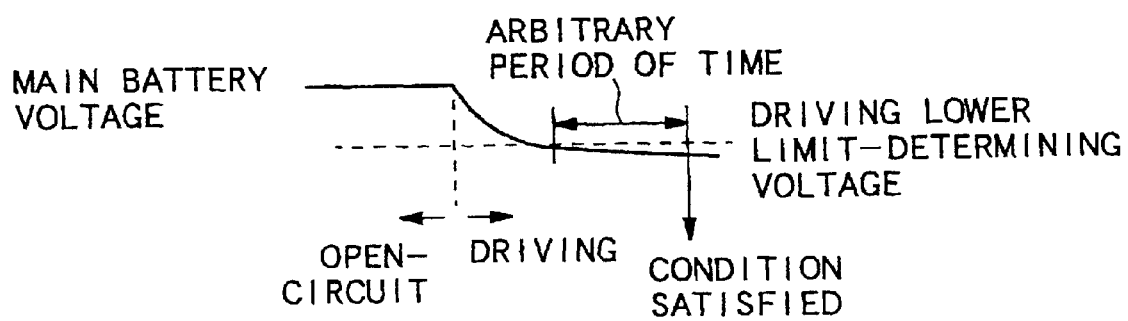
FIG. 11 is a time-chart showing when a low-limit main battery voltage at driving is higher than a main battery voltage at driving.

The transition from the drive/power generation-permitting control mode to the drive-prohibiting control mode by the above-mentioned main battery voltage control is made when any one of the following transitional conditions is satisfied:

(1) A main battery open-circuit voltage continues to be less than the drive-prohibiting determination voltage (a voluntary and/or predetermined set value) for an arbitrary period of time;

(2) A driving main battery voltage continues to be less than a driving lower limit-determining voltage (a voluntary and/or predetermined set value for each driving torque) for an arbitrary period of time;

As shown in FIG. 11, it is required that a driving main battery voltage is less than a driving lower limit-determining voltage for an arbitrary or predetermined period of time until a predetermined condition is concluded.

Figures 12, 13, 14:
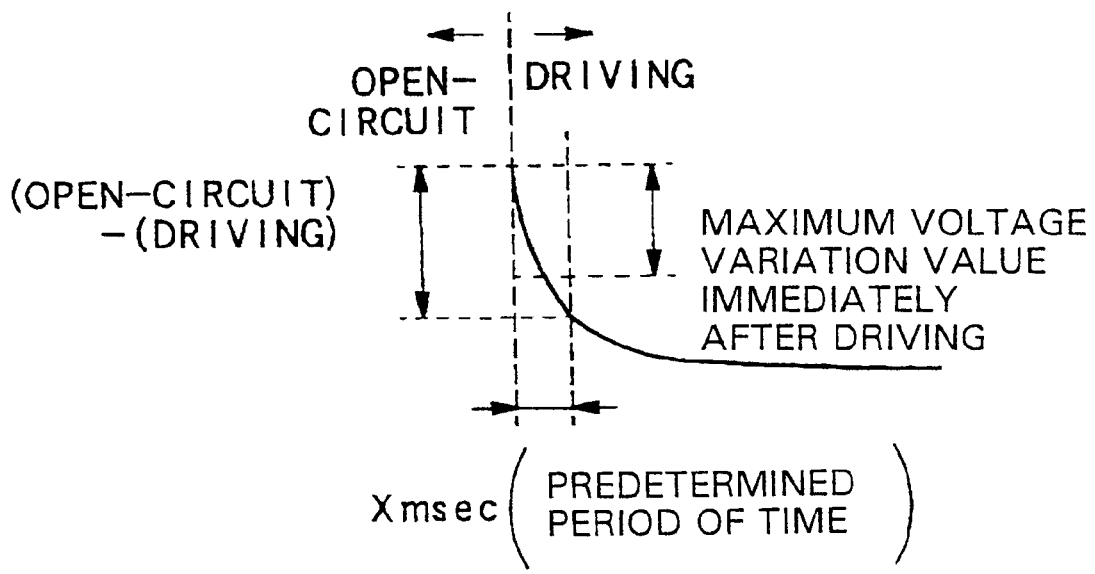
FIG. 12 is a map of a relation between driving torque and motor speed.
FIG. 13 is a time-chart showing when a maximum voltage variation value immediately after driving is lower than a main battery open-circuit voltage minus a driving voltage when X ms elapses after a motor starts its driving.
FIG. 14 is a map of a relation between driving torque and motor speed.

As shown in FIG. 12, a determining voltage is obtained from a map which consists of a driving torque and a motor speed.

(3) A value obtained from the main battery open-circuit voltage minus a driving voltage is greater than a maximum voltage variation value immediately after driving (a voluntary set value for each driving torque) when X ms (a voluntarily predetermined period of time) elapses after the motor 6 starts its driving;

As shown in FIG. 13, it is required that a value obtained from the main battery open-circuit voltage minus a driving voltage is greater than a maximum voltage variation value immediately after driving when X ms (a voluntarily predetermined period of time) elapses after the motor 6 starts its driving.

As shown in FIG. 14, a maximum voltage variation value is obtained from a map which consists of a driving torque and a motor speed.

(4) The main battery open-circuit voltage minus the driving voltage is greater than a driving maximum voltage drop value (a voluntarily set value for each driving torque) for a voluntarily predetermined period of time; and As shown in FIG. 15, it is required that the main battery open-circuit voltage minus the driving voltage is greater than a driving maximum voltage drop value for an arbitrary period of time until a predetermined condition is concluded.

As shown in FIG. 16, a driving maximum voltage drop value is obtained from a map which consists of a driving torque and a motor speed.

(5) The motor 6 is caused to stop after an arbitrary period of time elapses after the driving of the motor 6 starts, and an open-circuit voltage of the main battery is then checked.

In addition, when the above No. (5) condition is unsatisfied after checking the open-circuit voltage of the main battery, and as determined by the above No. (1) condition from the drive/power generation-permitting control mode to the drive-prohibiting control mode, then the motor 6 resumes its driving state to assist in propelling the vehicle.

Another transition from the drive-prohibiting control mode to the drive/power generation-permitting control mode is made when any one of the following transitional conditions is met:

(1) The main battery open voltage continues to be greater than the drive/power generation-permitting determination voltage (a voluntarily set value) over an arbitrary period of time;

(2) A power-generating main battery voltage continues to be greater than a power-generating upper limit-determining voltage (a voluntarily set value for each power-generating torque) for an arbitrary period of time;

As shown in FIG. 17, it is required that a power-generating main battery voltage is greater than a power-generating upper limit-determining voltage for an arbitrary period of time until a predetermined condition is concluded or satisfied.

As shown in FIG. 18, a power-generating upper limit-determining voltage is obtained from a map which consists of a power-generating torque and a motor speed.

(3) The motor 6 is caused to stop generating power when an arbitrary period of time elapses after the motor 6 starts generating power, and then the main battery open-circuit voltage is checked.

In addition, when the above No. (5) condition is unsatisfied after checking the main battery open-circuit voltage, and after a determination by the above No. (1) condition from the drive-prohibiting control mode to the drive/power generation-permitting control mode, then power generation is permitted again.

In addition, when a determination as to the above transitional condition No. (3) from the drive-prohibiting control mode to the drive/power generation-permitting control mode is terminated, then the motor control means 22 is put back into the control mode that was operative before such a determination was made, regardless of whether or not the above transitional condition No. (3) was met. Then, the motor control means 22 maintains such control. In addition, the time when the motor control means 22 is returned to the aforesaid control mode is newly defined as a power generation-starting time.

When the vehicle is started up by an ignition key (not shown), then the control means 18 controls start up by using the starter motor 16 while always assisting start up of the vehicle by driving the motor 6. The control means 18 of the engine side having both the engine control means 20 and the automatic start-up/stop control means 172, also has the function of controlling to automatically start up using the motor 6 only, in an automatic start-up control mode.

Therefore, when an automatic start-up condition predetermined in an automatic starting-up control mode is unsatisfied, then the control means 18 controls start up by using the starter motor 16 while always gaining assistance from driving the motor 6 in starting up the vehicle in the same manner as the starting-up control by an ignition key (not shown). When the automatic starting-up condition is unsatisfied as there is no problem in a main battery residual quantity, and when the control means determines the ability to start the vehicle with the motor 6 only, then restart by the motor 6 only is executed.

When the engine start-up only using the motor 6 is determined to be impossible, then the engine is started up by the starter motor 16. The motor 6 assists in raising engine speed after the engine is started. By this fact, the noise output by the vehicle is decreased as much as possible, and a restart including a starting mode in which a powerful torque is needed executes smoothly.

Furthermore, when only the motor 6 restarts the engine, or when the motor 6 and the starter motor 16 both operate to restart, then a usual starting-up revision is unnecessary because the motor 6 increase engine speed to a predetermined engine speed.

Figure 22:
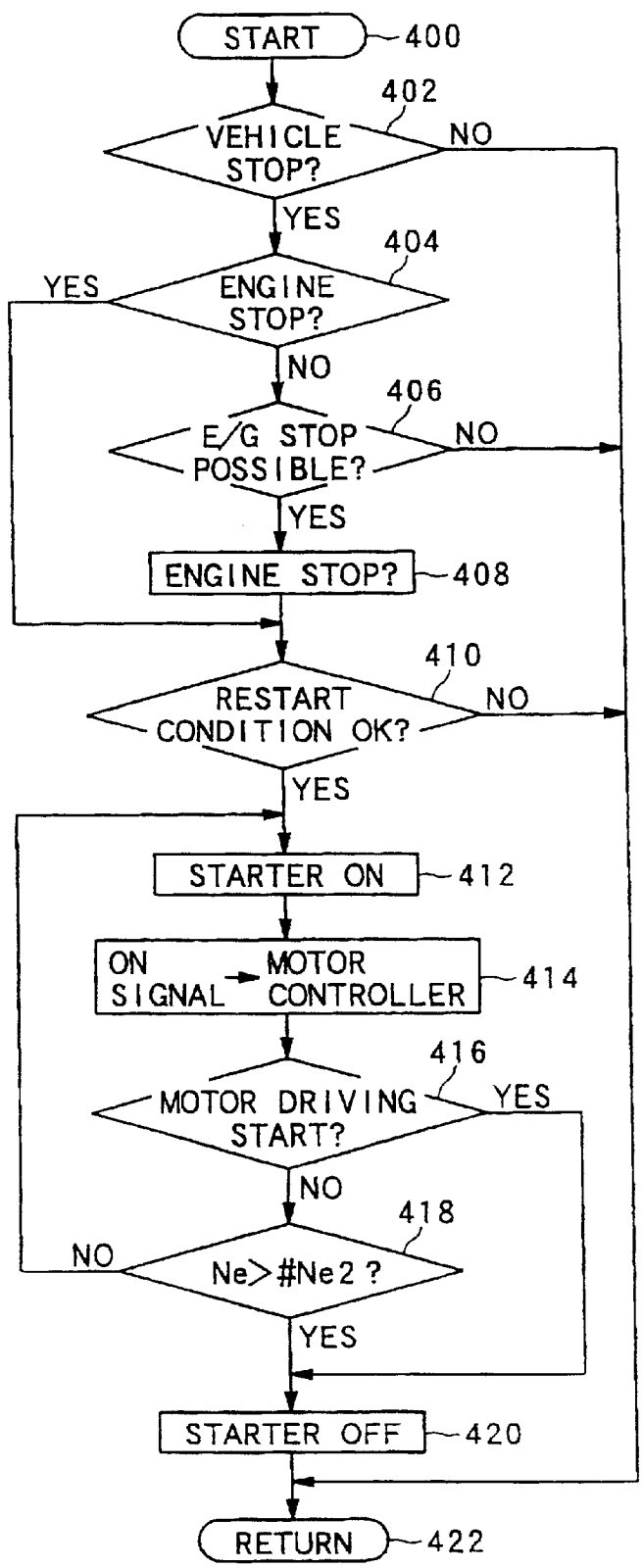
FIG. 22 is an engine control flowchart according to a second embodiment of the present invention.

In the present embodiment, the engine 4 is connected directly to the motor 6 that is positioned between the engine 4 and the manually operated transmission 10 as shown in FIG. 2. However, as long as motor 6 is communicated to the engine 4, a different position is possible. For example, a motor 6A (FIG. 20) may be disposed at an opposite end of the engine 4A relative to a position where the transmission 10A is connected to the engine 4A. In this case, the motor 6A includes a stator coil 6A-1 and a rotor 6A-2. The rotor 6A-2 is connected to the crank shaft of engine 4A. In addition, as shown in FIG. 22, when the engine 4B is connected directly to the motor 6B that is positioned between the engine 4B and the manually operated transmission 10B, then a starter coil 6B-1 and a rotor 6B-2 may be disposed in a dent part in a circumference of a flywheel 6B-3 which consists of more than one component.

In this connection, reference numerals 168 and 170 denote a cooling sub-radiator for the motor 6 and a rotor-driven water pump, respectively. The water pump 170 is driven under the control of the motor control means 22, thereby supplying the motor 6 with cooling water.

Operation of the embodiment will now be described with reference to control flowcharts in FIGS. 3 and 4 for use in the control means. The motor control means 22 is set into the stopping control mode and the traveling control mode as a select control mode that is based on an operating state of a vehicle.

Figure 3:
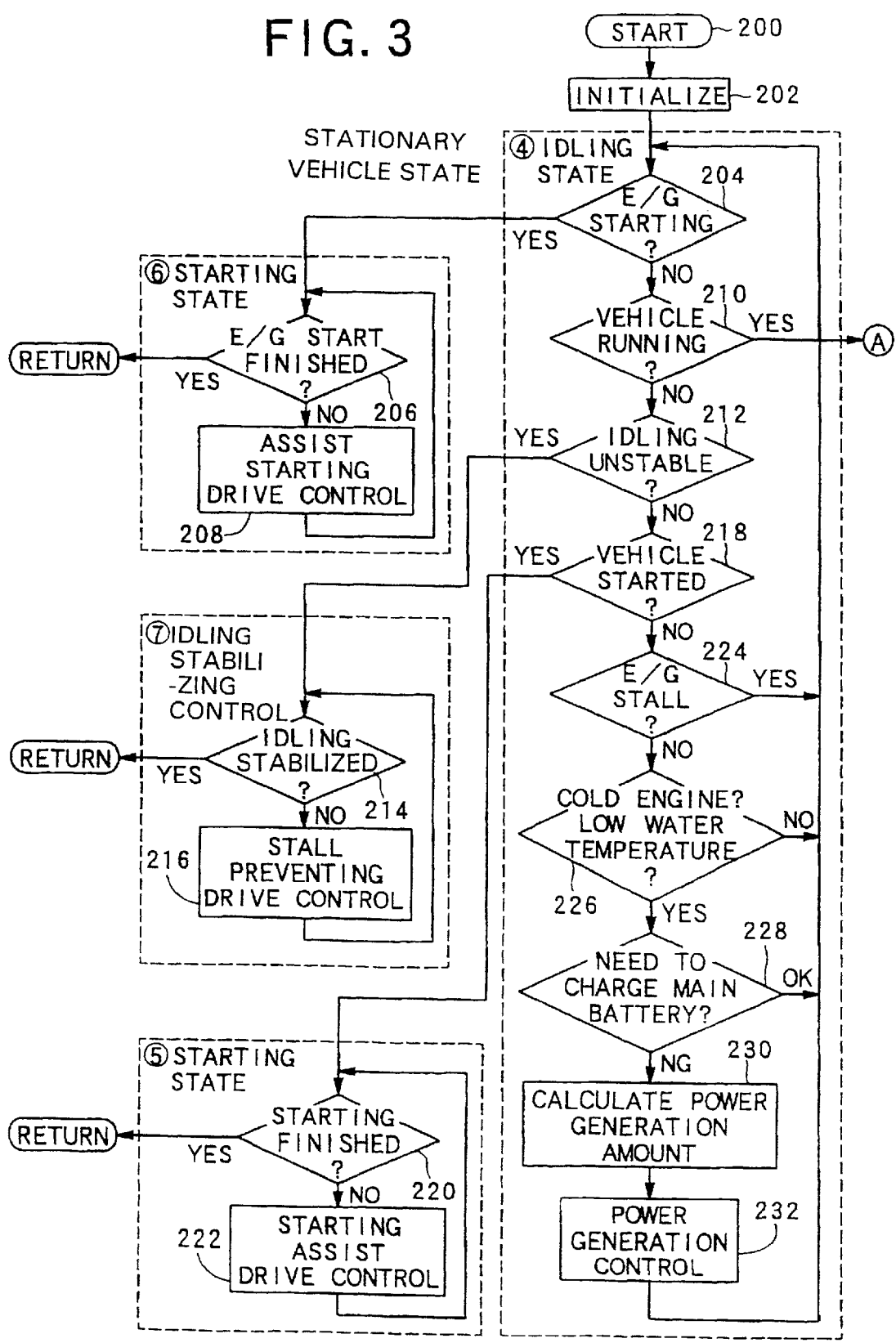
FIG. 3 is a control flowchart in a stopping control mode for use in a controller.

Referring now to FIG. 3, when the motor control means 22 is in the stopping control mode, it starts control at step 200, then the program is initialized at step 202. Then, a determination is made at step 204 as to whether the engine 4 is starting up.

When the determination in step 204 results in "YES", then it is determined at step 206 whether the start-up of the engine 4 has been completed. When the determination at step 206 is "YES", then the routine is returned to previous step 204. However, when the answer to the determination in-step 206 is "NO", then the motor control means 22 is put into a start-up drive control mode. The motor control means 22 then provides control over the motor 6 at step 208 so as to drive the motor 6 and assist in starting the engine 4. Then, the routine is returned to previous step 206.

When the determination in previous step 204 is "NO", then a determination is made at step 210 as to whether the vehicle is traveling. When the answer to the determination in step 210 is "YES", then the motor control means 22 is shifted to the traveling control mode as hereinafter described. When the determination in step 210 is "NO", then it is determined at step 212 whether idling is unstable.

When the determination in step 212 results in "YES", then it is determined at step 214 whether such idling has been stabilized. When the determination in step 214 is "YES", then the routine is returned to previous step 212. However, when the determination in step 214 results in "NO", then the motor control means 22 is put into an idle-stabilized drive control mode. The motor control means 22 then executes control over the motor 6 at step 216 so as to drive the motor 6 and stabilize idling of the engine 4. Then, the routine is returned to previous step 214.

When the determination in previous step 212 results in "NO", then it is determined at step 218 whether the vehicle has started moving. When the determination in step 218 is "YES", then a further determination is made at step 220 as to whether such vehicle motion has started. When the determination in step 220 is "YES", then the routine is returned to previous step 218. However when the determination in step 220 results in "NO", then the motor control means 22 is put into a starting motion drive control mode. The motor control means 22 then effects control over the motor 6 at step 222 so as to drive the motor 6 and assist in starting motion of the vehicle. Then, the routine is returned to previous step 220.

When the determination in previous step 218 is "NO", then it is determined at step 224 whether the engine 4 stalled. When the determination in step 224 is "YES", then the routine is returned to previous step 204. When the determination in step 224 is "NO", then a determination is made at step 226 as to whether the engine 4 is in a cold state and water temperature is low.

When the answer to the determination in step 226 is "NO", then the routine is returned to previous step 204. However, when the determination in step 226 results in "YES", then it is determined at step 228 whether the main battery 38 needs to be charged.

When the determination in step 228 results in "OK" because the main battery 38 need not be charged, then the routine is returned to previous step 204. However, when the determination in step 228 is "NG" because the main battery 38 must be charged, then a quantity of generated electric power is calculated at step 230. Further, the motor 6 is controlled at step 232 so as to generate power. Then, the routine is returned to previous step 204.

Figure 4:
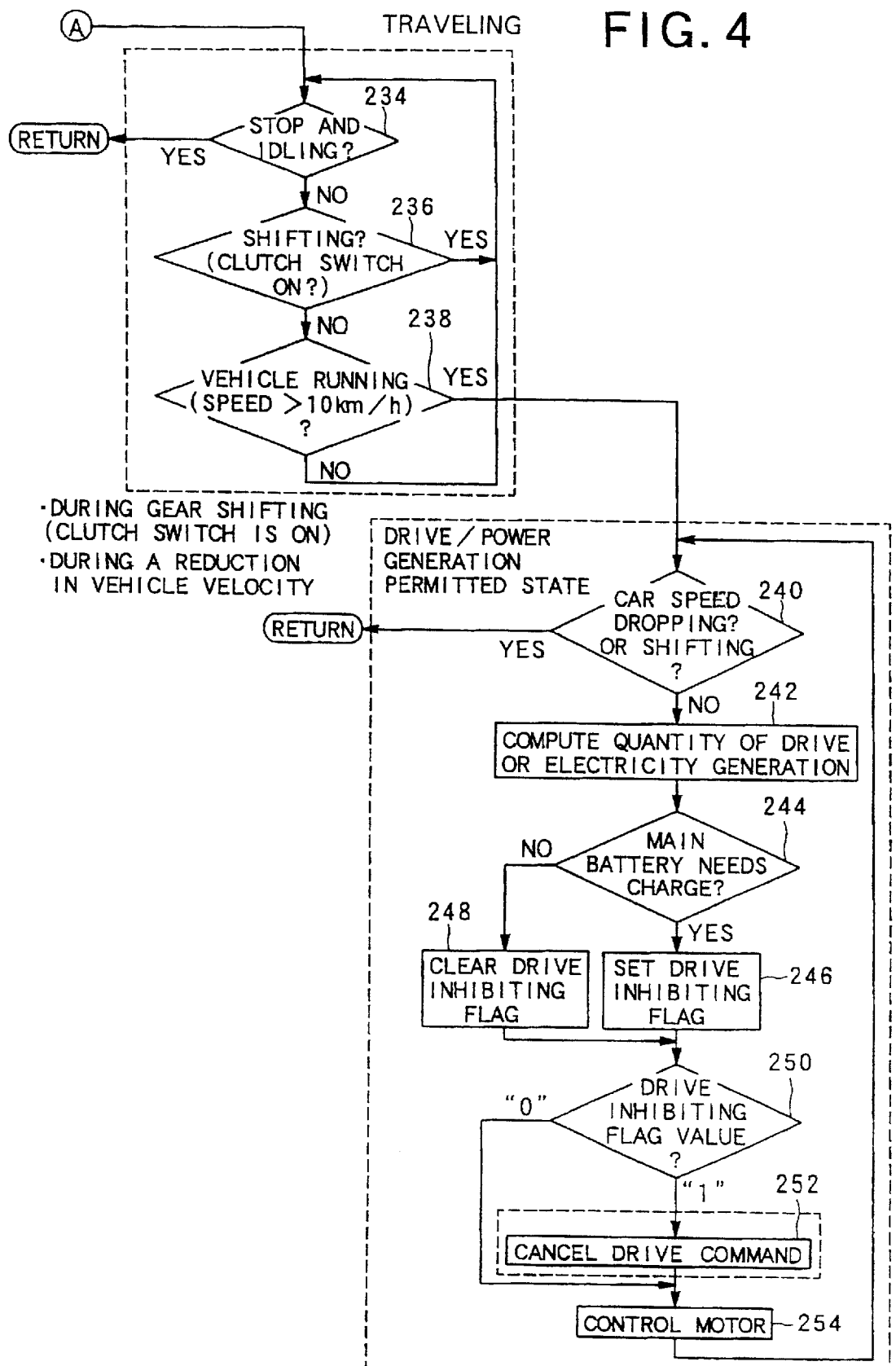
FIG. 4 is a control flowchart in a traveling control mode for use in the controller.
Figure 5:
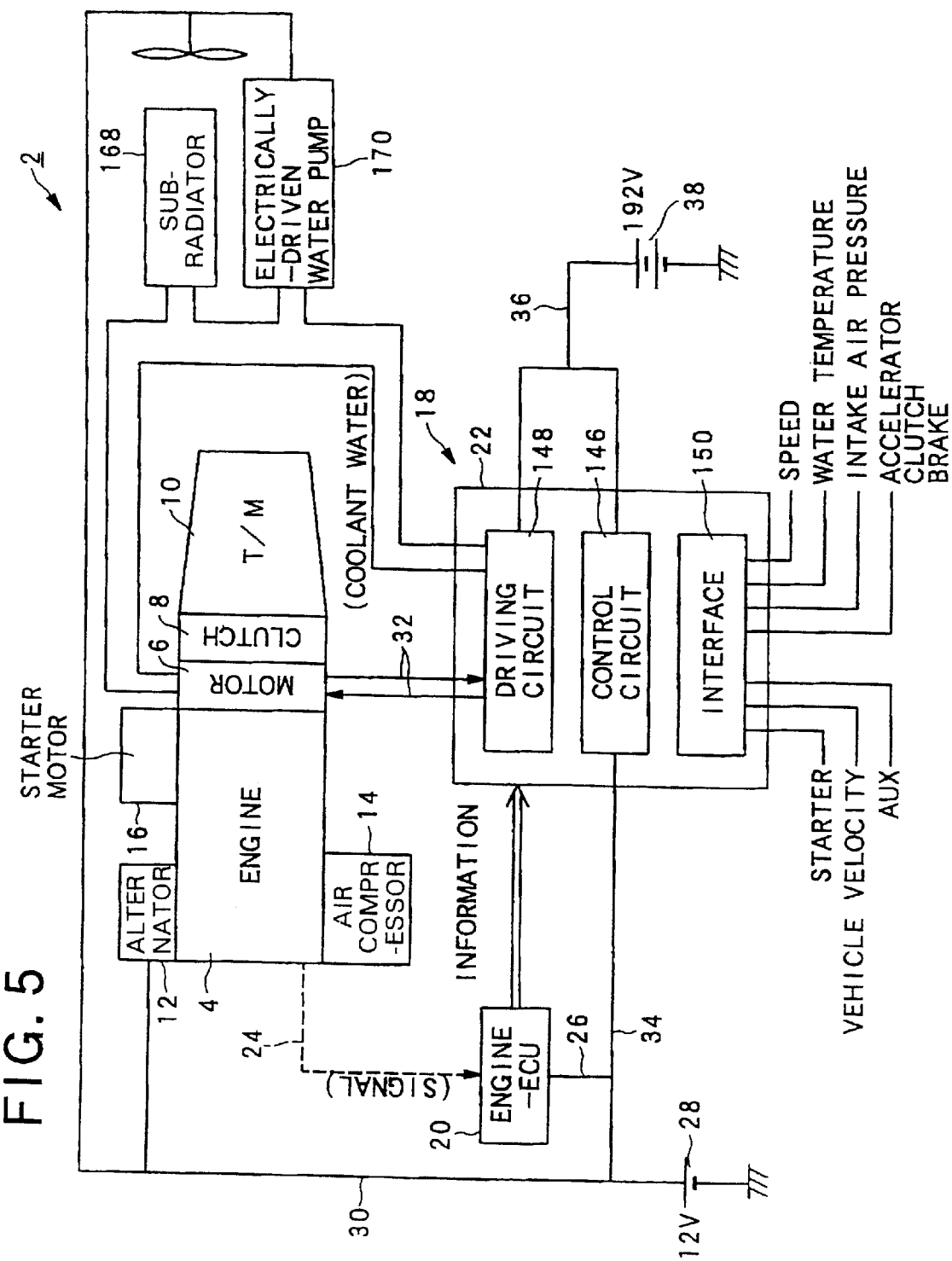
FIG. 5 is a block diagram illustrating a system for the controller of a vehicle-propulsion system.

When the determination step 210 is "YES", because the vehicle is traveling, then the motor control means 22 is at first put into a drive/power generation-prohibiting control mode, and control then shifts to the traveling control mode as illustrated in FIG. 4. In the drive/power generation-prohibiting control mode, a determination is made at step 234 as to whether the vehicle is halted in an idling state.

When the determination in step 234 is "YES", then the routine is returned to previous step 210 in the idling control mode as shown in FIG. 3. When the determination in step 234 is "NO", then it is determined at step 236 whether the clutch switch 160 has been activated (in the course of gear shifting or in a neutral position).

When the determination in step 236 is "YES", then the routine is returned to previous step 234. When the determination in step 236 is "NO", then it is determined at step 238 on the basis of a vehicle velocity signal from the vehicle velocity sensor 76 whether the vehicle is traveling.

When the determination in step 238 is "NO", the routine is returned to previous step 234. However, when the determination in step 238 is "YES", then the motor control means 22 shifts to a drive/power generation-permitting control mode in the traveling control mode. Then, a determination is made at step 240 as to whether vehicle velocity is on the decrease or the clutch switch 160 is "ON" (in the course of gear shifting or in a neutral position).

When the determination in step 240 is "YES", then the routine is returned to previous step 234. When the determination in step 240 results in "NO", then either a driving electrical quantity or a quantity of generated electric power is calculated at step 242, thereby deciding on either a driving order or a power-generating order. It is then determined at step 244 whether the main battery 38 needs to be charged.

When the determination in step 244 is "YES" because the battery 38 needs to be charged, then a "drive-prohibiting" flag is processed at step 246 so as to be set to one value, here a "1". When the determination in step 244 is "NO" because the main battery 38 need not be charged, then the drive-prohibiting flag is processed at step 248 so as to be another value, here cleared to "0".

It is then determined at step 250 whether the drive-prohibiting flag is either "1" or "0". When the answer to the determination in step 250 is "1", then the motor control means 22 is shifted to a drive-prohibiting control mode. When the result from previous step 242 is the driving order, then the driving order of the motor 6 is canceled at step 252, and only the power-generating order is made effective. When the answer to the determination is step 250 is "0", then the result from previous step 242 is rendered operative. Then, the motor 6 is controlled at step 254 according to either the effective driving order or power-generating order. Therefore, the routine is returned to previous step 240.

Next, operation of the embodiment will be described with reference to an automatic start-up/stop control flowchart in FIG. 1.

When the automatic start-up/stop control program starts at step 300, then a determination is made at step 302 as to whether the vehicle is stopped. When the determination is "NO", then the routine is returned to step 304. When the determination is "YES", then a determination is made at step 306 as to whether an idle stop (IS) system is on. When the answer to the determination in step 306 is "NO", then the routine is returned to step 308, and when the answer to the determination in step 306 is "YES", then a determination is made at step 310 as to whether the engine speed (motor speed) Ne is greater than a first predetermined value "#Ne1" (an inequality: Ne>#Ne1).

When the determination in step 310 results in "YES", then the routine is returned to step 312 of the IS determination mode for determining whether the vehicle is enabled to stop. When the determination in step 310 is "NO", then the routine is returned to step 314 for determining whether a restart command is set to be on. When the determination in step 312 is "NO", then the routine is returned to step 316. When the determination in step 312 is "YES", then an engine is stopped at step 318, and the routine is returned to step 320.

In step 314 for determining whether the above-mentioned restart command is set to be on, when the determination is "NO", then the routine is returned to step 322. When the determination is "YES", then it is determined at step 324 whether the restart mode by the motor only is enabled. When the determination in step 324 is "YES", then the routine is returned to step 326 of a motor drive mode. When the determination is "NO", then the starter motor is set to be on at step 328.

Figure 19:
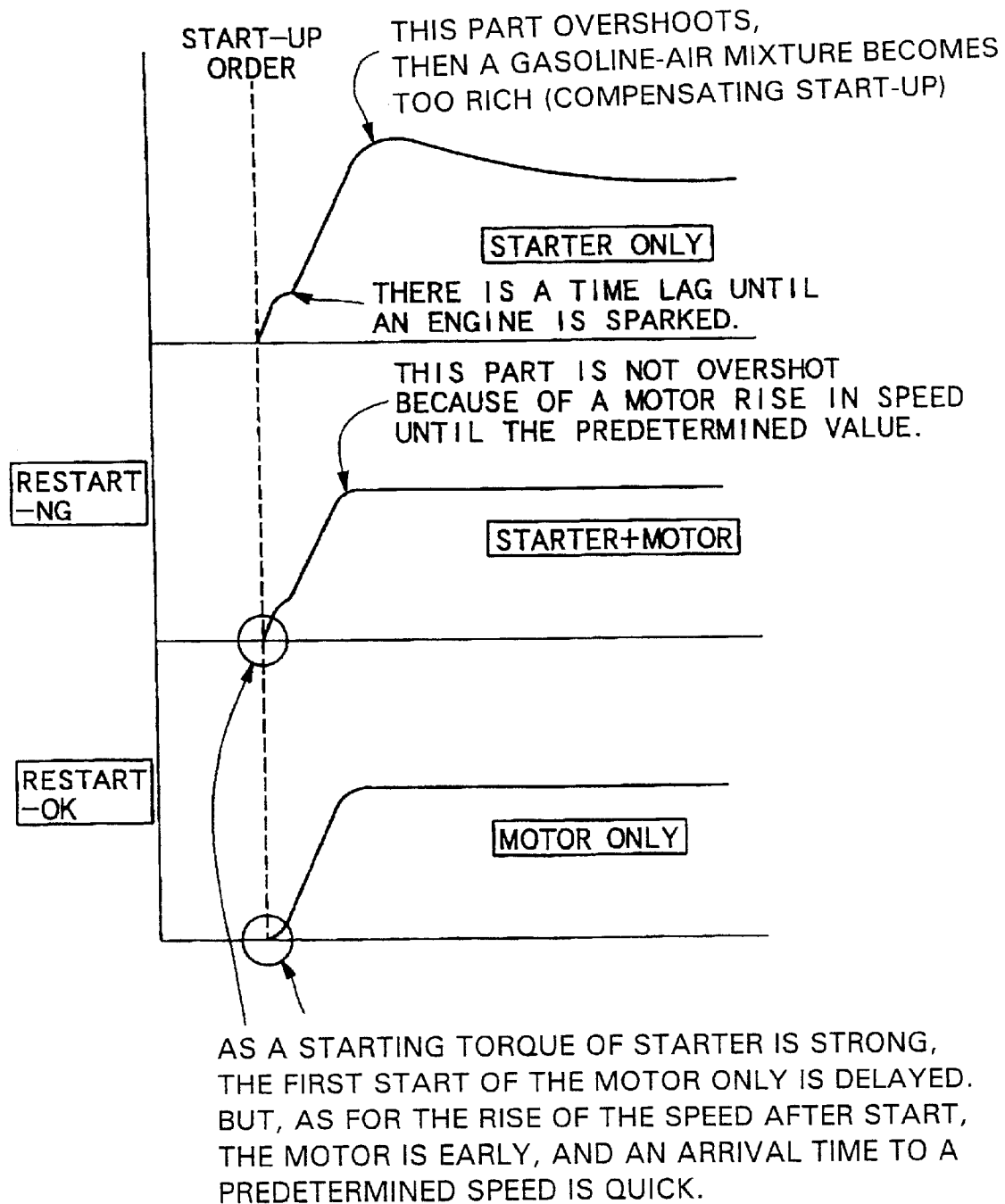
FIG. 19 is a time-chart showing a transition of an engine speed at restart-up in an idle stop system.
Figure 20:
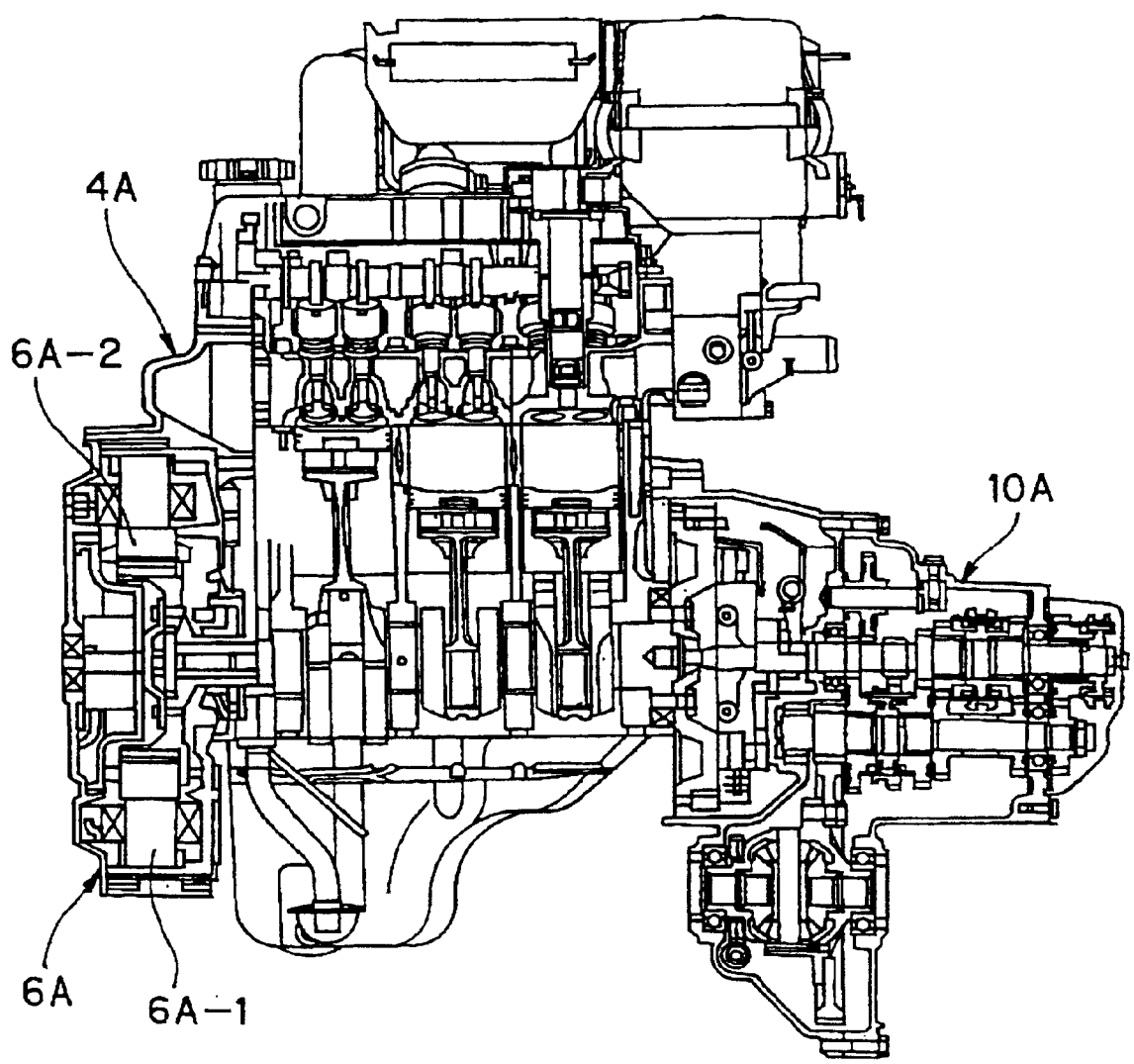
FIG. 20 is a schematic cross-sectional view of an engine, showing a first structure.
Figure 21:
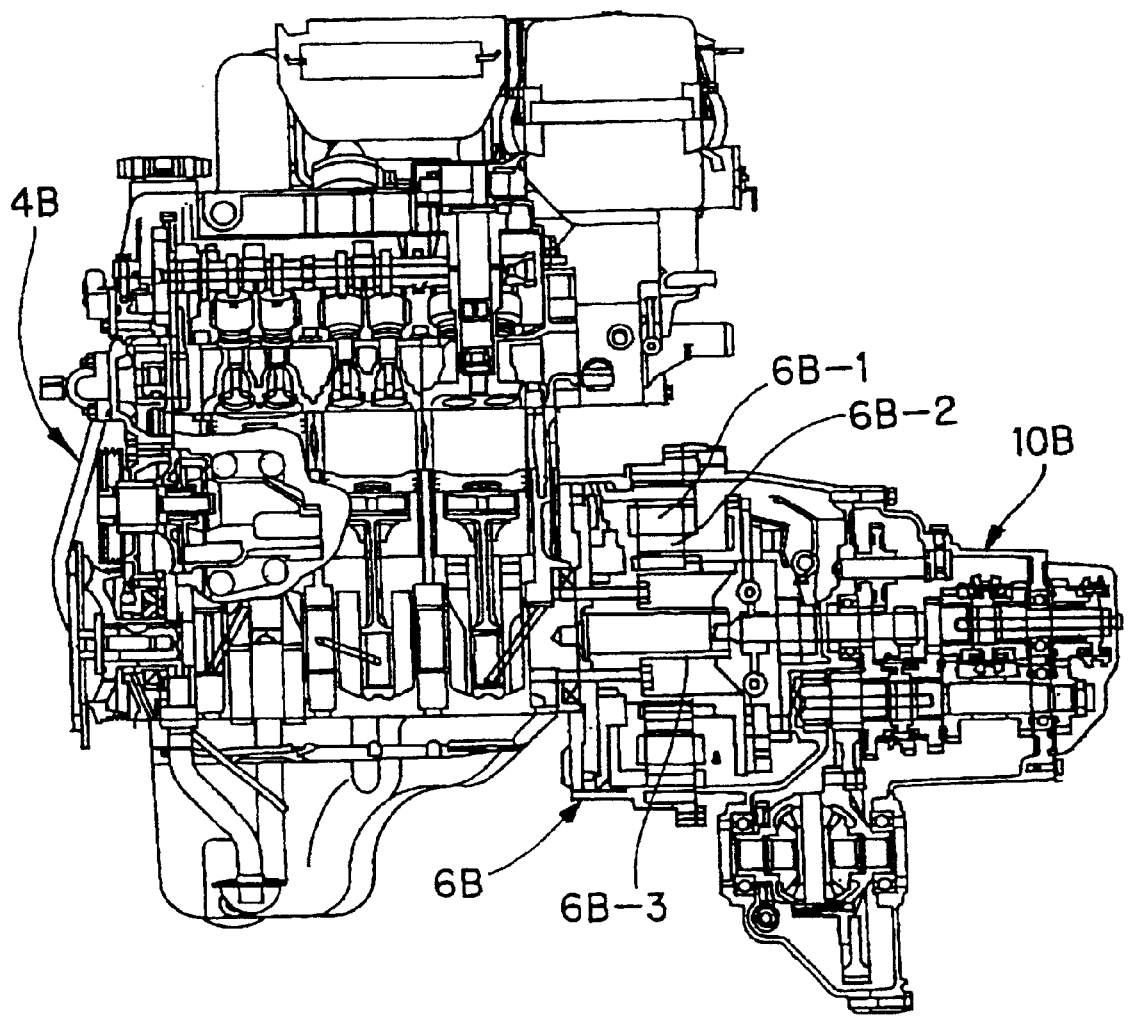
FIG. 21 is a schematic cross-sectional view of an engine, showing a second structure.

Therefore, in step 324 for determining whether the above-mentioned restart mode is by the motor only, the routine merely determines whether the starting by the motor only is enabled. Here, when the determination in step 324 is "YES", as shown in FIG. 19, then a starting-up by the motor only is done, and even if the determination in step 324 is "NO" because of a lack of battery power, as shown in FIG. 19, both the motor 6 and the starter motor 16, or the starter motor 16 is enabled to restart the engine.

Furthermore, after the above-mentioned motor is driven at step 326, a determination is made at step 330 as to whether the engine speed (motor speed) Ne is greater than a second predetermined value "#Ne2" (an inequality: Ne>#Ne2). When the determination in step 330 is "YES", then the routine is returned to step 332 of a stopping mode of the motor 6, and is returned to step 334. When the determination in step 330 is "NO", then a determination is made at step 336 as to whether the progress time "t" is over a first predetermined value "#t1" (an inequality: t>#t1). When the determination in step 336 is "NO", the routine is returned to step 326 of a motor driving mode, and when the determination is "YES", the routine is returned to step 332 of a motor stopping mode.

When the above-mentioned determination in step 324 is "NO", then a determination is made at step 338 as to whether the engine speed (motor speed) Ne is greater than a third predetermined value "#Ne3" (an inequality: Ne>#Ne3) after the starter motor 16 is set for an on mode at step 328. When the determination in step 338 is "NO", the routine is returned to step 328 of an on-processing mode for the starter motor 16. And, when the determination is "YES", then the motor 6 is driven (step 340), and a determination is made at step 342 as to whether the engine speed (motor speed) Ne is greater than a fourth predetermined value "#Ne4" (an inequality: Ne>#Ne4).

When the determination in step 342 is "NO", then the routine is returned to step 344 for determining whether the progress time "t" is greater than a first predetermined time value "#t2" (an inequality: t>#t2). When the determine in step 342 is "YES", then a determination is made at step 348 as to whether the engine speed (motor speed) Ne is greater than a fifth predetermined value "#Ne5" (an inequality: Ne>#Ne5) after the starter motor 16 is set for an on mode at step 346.

In addition, a determination is made at step 344 as to whether the progress time "t" is over a first predetermined value "#t2" (an inequality: t>#t2), and when the answer to the determination is "NO", then the routine is returned to step 340 of a driving processing mode of the motor 6. When the answer to the previous determination is "YES", then the starter motor 16 is stopped (step 350), and the routine is returned to step 352.

Furthermore, a determination is made at step 348 as to whether the engine speed (motor speed) Ne is greater than a fifth predetermined value "#Ne5" (an inequality: Ne>#Ne5), and when the answer to the determination is "NO", then the routine is returned to step 344 for determining whether the progress time "t" is over a first predetermined value "#t2" (an inequality: t>#t2). When the answer to the determination in step 348 is "YES", then the motor 6 is stopped (step 354), and the routine is returned to step 356.

By this invention, the starter side and engine side become independent, and the control means 18 cancels a noisy sound occurring when a ring gear is engaged with a starter motor gear. As a result, quietness is improved, and a clearance of the exhaust gas is expected because of an improved discharge characteristic, and besides, a simplification of a system is effected. The simplified system may have wide uses, and is achievable at reduced costs, which is economically advantageous. As the motor 6 always assists in starting up a vehicle, the above-mentioned noisy sound may be decreased even if started up by the starter, and the durability of a starter motor is improved.

When engine start-up by the motor only is determined to be impossible, then the stopped engine is started by the starter motor and the motor assists to increase engine speed after start-up. By this fact, the noise is decreased as much as possible, and a restart including a starting-up mode in which a powerful torque is needed executes smoothly, and the result is advantageous in practical use.

Furthermore, as the system of the engine side for an idle stop may not need to be changed, the restarting-up order only may be needed for the motor control means 22. Thus the restarting-up function of the motor 6 is easily added to the system.

Furthermore, even if the engine is restarted by the motor 6 only, or by both the motor 6 and the starter motor 16, a usual starting-up revision is unnecessary because the motor 6 increases engine speed to a predetermined engine speed, and a surplus fuel consumption is suppressed in start-up, and there is no deterioration of an exhaust gas level.

Figure 23:
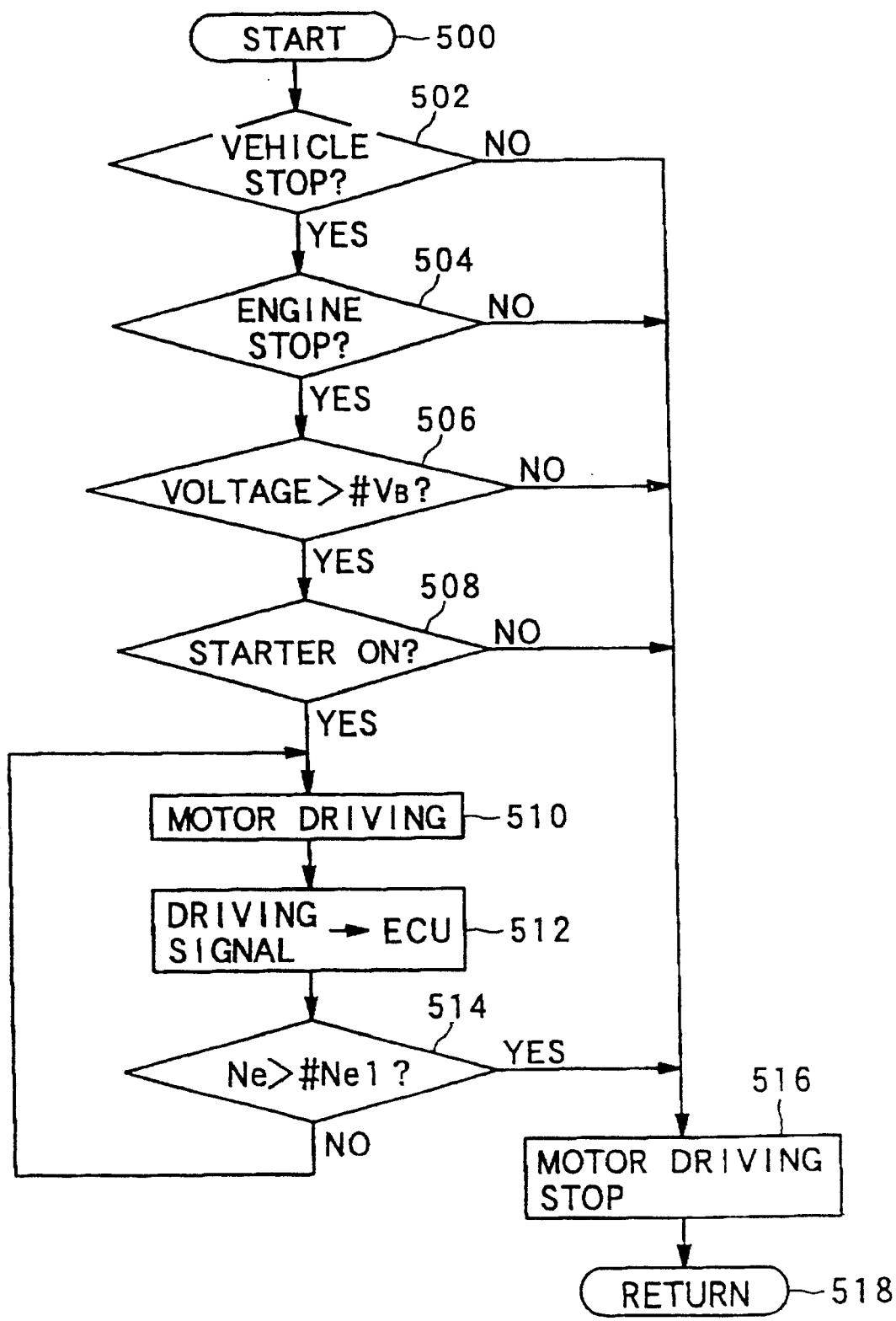
FIG. 23 is a motor control flowchart.

FIGS. 22 and 23 show the second embodiment of this invention. Those parts in the second embodiment with the same function as the corresponding parts in the first embodiment will be explained using the same numerals.

The second embodiment of this invention is characterized by a power-supply determining means for determining whether a power supply for driving a motor is in a usable state. The power supply determining means is connected to the control means, and the control means controls start-up of a vehicle using a motor and/or a starter motor.

The control means has a first function in which the control means controls to start an engine using a motor only, a second function in which the control means controls to start the engine with a starter motor and to continue cranking with an electric motor, and a third function in which the control means controls to start the engine with a starter motor only. The control means consists of a so-called usual idle stop system connected to a power-supply determining means, for determining whether a power supply is in an usable state by a signal from the power supply determining means. The control means controls so as to determine whether the power supply is in a usable state, and executes one of the first to the third functions.

Operation of the embodiment having the engine control means will now be described with reference to an engine control flowchart in FIG. 22. When the engine control program starts at step 400, then a determination is made at step 402 as to whether the vehicle is stopped. When the determination in step 402 is "NO", then the routine is returned to step 422 (described later). When the previous determination is "YES", then a determination is made at step 404 as to whether the engine is stopped.

When the determination in previous step 404 is "YES", then the routine is returned to step 410 for determining whether the restarting-up condition described later is satisfied, in other words "OK". When the determination in previous step 404 is "NO", then the routine is returned to step 406 for determining whether the engine may be stopped.

When the determination in previous step 406 is "NO", then the routine is returned to step 422 (described later). When the determination in previous step 406 is "YES", then the engine is stopped (408), and a determination is made at step 410 as to whether the restarting-up condition is satisfied, in other words "OK".

When the determination in step 410 is "NO", then the routine is returned to step 422 (described later). When the determination in step 410 is "YES", then a determination is made at step 416 as to whether the motor drive can start, after the starter motor is "ON" at step 412 (operated), and the "ON" signal output from the engine control means is outputted to the motor control means at step 414. When the above-mentioned determination in step 416 is "NO", then the routine is returned to step 418 for determining whether the engine speed Ne is greater than a second predetermined value "#Ne2" (an inequality: Ne>#Ne2). When the determination is "YES", then the routine is returned to step 422 after the starter motor is set for an on mode at step 420.

In addition, a determination is made at step 418 as to whether the engine speed Ne is greater than a second predetermined value "#Ne2" (an inequality: Ne>#Ne2), and when the determination in step 418 is "NO", the routine is returned to step 412 of an on-processing mode of the starter motor. When the determination in step 418 is "YES", the routine is returned to step 420 of an off-processing mode of the starter motor.

Operation of the embodiment will now be described with reference to a control flowchart in FIG. 23 for use in the motor control means.

When the motor control program starts at step 500, then a determination is made at step 502 as to whether the vehicle is stopped. When the determination is "NO", then the routine is returned to step 516 of a stop processing mode for a driving motor. When the determination is "YES", then a determination is made at step 504 as to whether an engine is stopped.

When the determination in step 504 is "NO", the routine is returned to step 516 of a stop processing mode of a motor in driving (described later). When the determination at step 504 is "YES", the routine is returned to step 506 for determining whether a voltage V is over a predetermined value "#VB" (an inequality: V>#VB).

When the determination in step 506 is "NO", then the routine is returned to step 516 of a stop processing mode of a driven motor. When the determination in step 506 is "YES", then the routine is returned to step 508 for determining whether the starter motor is set for an on-mode.

When the determination in step 508 is "NO", then the routine is returned to step 516 of a stop-processing mode of a motor in driving. When the determination in step 508 is "YES", then the motor is driven (step 510), and the driving signal is output in the engine control means (ECU) (step 512), and then a determination is made at step 514 as to whether the engine speed Ne is greater than a first predetermined value "#Ne1" (an inequality: Ne>#Ne1).

A determination is made at step 514 as to whether the engine speed (motor speed) Ne is over a first predetermined value "#Ne1" (an inequality: Ne>#Ne1), and when the determination in step 514 is "NO", then the routine is returned to step 510 of a driving processing mode of the motor. When the determination in 514 is "YES", then the routine is returned to step 516 of a stop processing mode of a driven motor and the routine is returned to step 518.

In response to a signal from the power supply determining means, the control means determines whether the power supply is in an usable state, so as to execute one of the first through third functions. This way, the control means can avoid surplus use of a power supply battery, can get a good automatic start/stop function, and is profitable in practical use, while improving the reliability of control.

In addition, in the same manner as the above-mentioned first embodiment, the control means cancels noisy sounds occurring when a ring gear is engaged with a starter motor gear. As a result, the quietness is improved, and is profitable in practical use. A clearance of the exhaust gas is expected because of an improved discharge characteristic for exhaust gas. The simplified system can have wide uses, and is achievable at reduced costs, which is economically advantageous.

Furthermore, a position determining means determines whether a shift lever is at a neutral position and is connected to a control means. The shift lever position is grasped or communicated by a signal from the position determining means. Therefore, the automatic start-up/stop control is executed according to the shift lever position, and the reliability of the control is improved.

This invention is not limited to the first and second embodiments, but is suitable to many possible innovations and applications. For example, in the embodiment of this invention, the automatic start/stop control means controls a drive control by using one motor. But, as a special arrangement, this invention can include two motors, such as first and second motors, having different performance characteristics. If either of the two motors can start, then when an engine breaks down, the control means can provide emergency support.

By changing an output performance of the first motor and the second motor, a start-up pattern in an automatic start-up mode is increased. As a result, the automatic start-up control can execute corresponding to the situation, and the convenience improves. Incidentally, when two motors is disposed, the performance of the two motors may be the same.

The embodiment of this invention is described assuming that a starter motor is disposed in the vehicle. However, if an improvement of performance of the motor and power supply can come true, the starter motor can be removed, and as a special constitution, the motor only may be used to start the vehicle engine. By removing a starter motor, an attendant advantage of reduction of parts and quiet start-up are achieved.

As amplified in the above description, the present invention provides a motor control apparatus combined with an engine and a motor disposed therein as a vehicle-propelling system. The motor is connected to a crank shaft of the engine and has both driving and power-generating functions. An automatic start-up/stop control means consisting of automatic start-up control and automatic stop control sections, controls start up by using the starter motor while always gaining assistance from the motor in starting up the vehicle when started with a key. The control means automatically controls start up of the motor only by the automatic start-up control, which is independent from the starter side and engine side, and which prevents noisy sounds from occurring when a ring gear is engaged with a starter motor gear. This arrangement improves the quietness of the engine and is advantageous in practical use. This arrangement enhances clearance of exhaust gas because of expected improved characteristics of the exhaust gas. The simplified system may have wide uses and is achievable at reduced costs which are economically advantageous. As the motor always assists in starting up a vehicle, noisy sound can be decreased by not using the starter, and durability of a starter motor thus may be improved. Furthermore, as the engine side system of an idle stop vehicle may not need any changes, the restart-up function by an electric motor is easily added to the system.

What is claimed is:

1. A motor control apparatus combined with an internal combustion engine and an electric motor directly connected to a crank shaft of the engine, said motor control apparatus having both driving and power-generating functions, the motor control apparatus including an automatic start-up/stop controller comprising an automatic start-up control section and an automatic stop control section, wherein said automatic start-up control section, during manual starting of a vehicle with a key, always starts the vehicle with a starter motor and the electric motor vehicle, and said automatic start-up control section is capable of automatically starting the engine using only the electric motor.

2. The motor control apparatus combined with an internal combustion engine as defined in claim 1, wherein, when a predetermined automatic start-up condition in an automatic start-up control mode is unsatisfied, said automatic start-up control section controls start-up using the starter motor and the electric motor, in the same manner as the starting-up control using the key.

3. The motor control apparatus combined with an internal combustion engine as defined in claim 1, wherein said automatic start-up/stop controller has a first function in which said controller starts the engine only with the electric motor, a second function in which said controller starts the engine using the starter motor and continues cranking with the electric motor, and a third function in which said controller controls start-up with the starter motor only, and comprises an idle stop system, said motor control apparatus including a power-supply determining means for determining whether a power supply is at a usable state, wherein, by a signal received from said power supply determining means whether said power supply is in a usable state, said automatic start-up/stop controller executes one of the first to the third functions.

4. A hybrid vehicle comprising:
an internal combustion engine mounted on the vehicle;
an electric motor directly connected to a shaft of said engine, said electric motor having both driving and power-generating functions;
a starter motor for use in starting said engine; and
a motor control apparatus for executing automatic start-up/stop control of said electric motor, said motor control apparatus including an automatic start-up/stop controller that, during manual operation of said starter motor by a key, controls said electric motor to assist said starter motor in manual engine start-up, wherein said automatic start-up/stop controller is capable of automatically starting said engine using only said electric motor.

5. The hybrid vehicle of claim 4, wherein, when a predetermined automatic start-up condition in an automatic start-up control mode is not satisfied, said automatic start-up/stop controller controls start-up by operation of said starter motor and said electric motor.

6. The hybrid vehicle of claim 4, wherein said automatic start-up/stop controller has a first function for starting said engine only with said electric motor, a second function for starting said engine using said starter motor and said electric motor, and a third function for starting said engine using only said starter motor.

7. The hybrid vehicle of claim 6, wherein said motor control apparatus includes:

an idle stop system; and a power-supply determining means for determining whether a power supply is in a usable state, wherein said automatic start-up/stop controller executes one of the first and second functions when said power-supply is in the usable state.

8. A hybrid vehicle comprising:

an internal combustion engine mounted on the vehicle;

an electric motor directly connected to a shaft of said engine, said electric motor having both driving and power-generating functions;

a main battery for receiving and providing power to said electric motor;

a starter motor for use in starting said engine;

a sub-battery for providing power to said starter motor; and a motor control apparatus that, during manual operation of said starter motor by a key, controls said electric motor to always assist said starter motor in manual engine start-up, said motor control apparatus including an automatic start-up/stop controller that, in an automatic start-up control mode, 1) automatically starts said engine using only said electric motor when a start-up condition is satisfied, and 2) starts said engine using said starter motor and said electric motor when said start-up condition is not satisfied.

9. The hybrid vehicle of claim 8, including a power-supply determining device for determining whether said main battery is in a usable state, wherein said automatic start-up/stop controller, in the automatic start-up control mode, 3) starts said engine using only said starter motor when a start-up condition is not satisfied and said power-supply determining device determines that said main battery is not in a usable state.

* * * * *